(12) United States Patent (10) Patent No.: US 8,831,978 B2
Patel et al. (45) Date of Patent: Sep. 9, 2014

(54) DEAL ANALYSIS WORKBENCH FOR A CUSTOMER RELATIONSHIP MANAGEMENT ENVIRONMENT

(75) Inventors: Tarak Ishwarbhai Patel, Atlanta, GA (US); William Thomas Turchin, Atlanta, GA (US); David Andrew Fraser, Decatur, GA (US); David Wayne Trice, Roswell, GA (US); Stanley Edward Quinn, Buford, GA (US); Laurel Ann Turner, Sweet Home, OR (US); Rachel Alexander Scales, Atlanta, GA (US); Paul Lars Helgeson, Grand Rapids, MI (US)

(73) Assignee: Oracle International Corporation, Redwood Shores, CA (US)

( * ) Notice: Subject to any disclaimer, the term of this patent is extended or adjusted under 35 U.S.C. 154(b) by 520 days.

(21) Appl. No.: 12/713,856

(22) Filed: Feb. 26, 2010

(65) Prior Publication Data

US 2010/0223104 A1 Sep. 2, 2010

Related U.S. Application Data

(60) Provisional application No. 61/156,462, filed on Feb. 27, 2009.

(51) Int. Cl.
*G06Q 30/00* (2012.01)
*G06Q 30/02* (2012.01)

(52) U.S. Cl.
CPC ........ *G06Q 30/0283* (2013.01); *G06Q 30/0241* (2013.01); *G06Q 30/0206* (2013.01)
USPC ..................... 705/14.66; 705/14.33; 705/400; 705/7.29

(58) Field of Classification Search
None
See application file for complete search history.

(56) References Cited

U.S. PATENT DOCUMENTS

| 5,873,069 | A | 2/1999 | Reuhl et al. ..................... 705/20 |
| 7,015,912 | B2 | 3/2006 | Marais ....................... 345/440.2 |
| 7,072,848 | B2 | 7/2006 | Boyd et al. ..................... 705/10 |
| 7,158,943 | B2 * | 1/2007 | van der Riet ............... 705/14.41 |
| 7,181,419 | B1 * | 2/2007 | Mesaros ....................... 705/26.2 |
| 7,233,928 | B2 | 6/2007 | Huerta et al. ................. 705/400 |
| 7,272,575 | B2 * | 9/2007 | Vega ............................... 705/80 |
| 7,308,421 | B2 | 12/2007 | Raghupathy et al. ........... 705/20 |
| 7,328,164 | B2 | 2/2008 | Krikler et al. ..................... 705/1 |
| 7,360,697 | B1 | 4/2008 | Sarkar et al. ................. 235/383 |
| 7,613,626 | B1 * | 11/2009 | Muniganti et al. ........... 705/7.35 |

(Continued)

OTHER PUBLICATIONS

Lars Meyer-Waarden, The effects of loyalty programs on customer lifetime duration and share of wallet, Journal of Retailing, vol. 83, Issue 2, Apr. 2007, pp. 223-236, ISSN 0022-4359.*

(Continued)

*Primary Examiner* — Gurkanwaljit Singh
(74) *Attorney, Agent, or Firm* — Campbell Stephenson LLP

(57) ABSTRACT

The present invention provides a method, system and computer-readable storage medium storing instructions for facilitating consistent application of price polices on every sales transaction supported through a customer relationship management system, in order to identify price exceptions in violation of stated corporate pricing objectives. Having such capabilities coupled with a customer relationship management system enables embodiments of the present invention to reduce the time to identify and evaluate price exceptions that impact revenue and margin. Agents responsible for sales interaction with customers can immediately identify violations of price policies. Those responsible for authorizing exceptions can easily determine the effect of those exceptions upon impacted markets.

23 Claims, 22 Drawing Sheets

(56) References Cited

U.S. PATENT DOCUMENTS

| | | | |
|---|---|---|---|
| 2002/0069079 A1* | 6/2002 | Vega | 705/1 |
| 2003/0126053 A1 | 7/2003 | Boswell et al. | 705/36 |
| 2004/0135782 A1 | 7/2004 | Marais | 345/440 |
| 2004/0139001 A1* | 7/2004 | Henriques et al. | 705/39 |
| 2005/0114257 A1* | 5/2005 | Penney | 705/37 |
| 2006/0031178 A1 | 2/2006 | Lehrman et al. | 705/400 |
| 2006/0031179 A1* | 2/2006 | Lehrman | 705/400 |
| 2006/0047608 A1 | 3/2006 | Davis et al. | 705/400 |
| 2006/0080338 A1* | 4/2006 | Seubert et al. | 707/100 |
| 2006/0178960 A1 | 8/2006 | Lepman | 705/30 |
| 2007/0260521 A1* | 11/2007 | Van Der Riet | 705/14 |
| 2008/0021794 A1* | 1/2008 | Vega | 705/26 |
| 2008/0126264 A1* | 5/2008 | Tellefsen et al. | 705/80 |
| 2008/0255984 A1* | 10/2008 | Millstone | 705/38 |
| 2009/0192873 A1* | 7/2009 | Marble | 705/10 |
| 2009/0234710 A1* | 9/2009 | Belgaied Hassine et al. | 705/10 |
| 2009/0259523 A1* | 10/2009 | Rapperport et al. | 705/10 |

OTHER PUBLICATIONS

Rust, Roland T., et al. "Measuring Marketing Productivity: Current Knowledge and Future Directions." Journal of Marketing 68 (2004): 76-89.*

Gummesson, Evert. "Relationship Marketing in the New Economy." vol. 1 No. 1 2002 1 (2002): 37.*

Venkatesan, Rajkumar, and V. Kumar. "A Customer Lifetime Value Framework for Customer Selection and Resource Allocation Strategy." Journal of Marketing 68 (2004): 106-125.*

"Modeling Customer Lifetime Value" Gupta, Sunil;Hanssens, Dominique;Hardie, Bruce;Kahn, Wiliam;et al Journal of Service Research : JSR; Nov. 2006; 9, 2.*

Consumer Learning: Advertising and the Ambiguity of Product Experience Stephen J. Hoch and Young-Won Ha Journal of Consumer Research, vol. 13, No. 2 (Sep. 1986), pp. 221-233.*

Kamakura, W., Mela, C. F., Ansari, A., Bodapati, A., Fader, P., Iyengar, R., . . . & Wilcox, R. (2005). Choice models and customer relationship management. Marketing Letters, 16(3), 279-291.*

Doyle, P. (2001). Value-based marketing: Marketing strategies for corporate growth and shareholder value. Marketing Management, 10(2), 53-54.*

Reuben Schwartz, "Extending the Power of the Price Waterfall to Customer Value," available via the Internet at http://www.mimiran.com/res/materials/Value_Price_Waterfall.pdf, May 2007, pp. 1-6.

Mike Simonetto et al., "Focus on Price Executions: Ways to Improve Profitability," available via the Internet at http://members.pricingsociety.com/article/focus-on-price-execution-ways-to-improve-profitability.pdf, Oct. 4, 2004, vol. 14, No. 1, pp. 1-11.

Robert Garfinkel et al., "Empirical Analysis of the Business Value of Recommender Systems," available via the Internet at http://archive.nyu.edu/bitstream/2451/14965/2/USEDBOOK6.pdf, Nov. 2006, pp. 1-40.

* cited by examiner

DEAL ANALYSIS WORKBENCH FOR A CUSTOMER RELATIONSHIP MANAGEMENT ENVIRONMENT

CROSS REFERENCE TO RELATED APPLICATIONS

This application claims the benefit under 35 U.S.C. §119 (e) of U.S. Provisional Application No. 61/156,462 filed Feb. 27, 2009, entitled "Deal Management in a Customer Relationship Management Environment," and naming Tarak Ishwarbhai Patel, Arun Abichandani, William Thomas Turchin, Deepak Hazarika, David Andrew Fraser, Paul Lars Helgeson, Anamitra Debnath, Neha Dubey, Kalyanpur Satish Baliga, Arvind Dangeti, Stanley Edward Quinn, Laurel Ann Turner, Rachel Alexander Scales, and David Wayne Trice as inventors. The above-referenced application is hereby incorporated by reference herein in its entirety as if completely and fully set forth herein.

FIELD OF THE INVENTION

The present invention relates to deal management in a customer relationship management environment, and, more particularly, providing a pricing approval workbench tool to access integrated data related to a deal negotiation process, in order to aid in achievement of profit and revenue objectives.

BACKGROUND OF THE INVENTION

Business entities interact with customers, potential customers and other contacts through a wide variety of different communication channels. Such communication channels include face-to-face, telephone, fax, email, voicemail, wireless communication, Internet sessions, and the like. With all these various communication channels, business entities are faced with managing each customer interaction while meeting service levels and maximizing customer satisfaction. In addition, business entities are faced with staffing and training a workforce to interact with customers through these communication channels through, for example, customer support centers, telebusiness organizations, or sales, marketing and service professionals. Customer relationship management (CRM) applications enable business entities to more effectively sell to, market to, and serve their customers across multiple channels in any industry.

In a competitive marketing environment, business entities have historically strived to increase profits by reducing costs and increasing sales volumes. But there is a limit to the effectiveness of cost cutting initiatives to improve corporate revenues. Once cost cutting initiatives have been in place, a business entity tends to focus on improving pricing performance in order to maximize profitability. One such focus relates to pricing initiatives that can more fully capture value of a business entity's product offerings to their customers. As a result, price management solutions are desired by business entities in helping to achieve profit and revenue objectives. Enabling an organization to enhance margin and revenue by delivering value-driven prices to value-conscious customers throughout the business entity, while employing industry best practices is desirable.

A deal management solution that provides a mechanism for creation of price policies and enforcement of those price policies throughout a business entity is desired. Tying such a deal management solution to a customer relationship management environment will enable dissemination of price policies throughout the business entity through the CRM environment. Thus, price policies can be quickly instituted at every level impacted by the CRM solution. It is further desired to have access to deal and customer data when making price approval decisions. Such access should provide a price approval manager with information showing impact of a deal that does not fit within pricing policies upon other deals in a competitive segment.

SUMMARY OF THE INVENTION

The present invention facilitates consistent application of price polices on every sales transaction supported through a customer relationship management system, in order to identify price exceptions in violation of stated corporate pricing objectives. Having such capabilities coupled with a customer relationship management system enables embodiments of the present invention to reduce the time to identify and evaluate price exceptions that impact revenue and margin. Agents responsible for sales interaction with customers can immediately identify violations of price policies. Those responsible for authorizing exceptions can easily determine the effect of those exceptions upon impacted markets.

Embodiments of the present invention provide a deal analysis system, method or computer readable storage medium storing instructions for deal analysis that select a deal stored in one or more deal management tables of a customer relationship management system database, compare parameters of the deal with corresponding parameters of deals associated with a customer population segment comprising a customer associated with the deal, and display results of the comparison. One aspect of the above embodiment provides an analysis subsystem to perform the selecting and comparing, and a display subsystem to perform the displaying.

Another aspect of the above embodiment generates a price score as part of the comparing of parameters. The price score is a relative relation of a product price associated with the deal and the product's price in the customer population segment. Generating the price score can be performed by generating a segment score, generating a margin score, and adding a weighted segment score to a weighted margin score. The segment score reflects a proximity of a current pocket price of the product as represented by the deal to a recommended pocket price. The margin score reflects a margin percent of the product price associated with the deal.

A further aspect of the above embodiment provides for automatically selecting a deal based upon whether the deal or a line item price in the deal is out of a guideline associated with the deal or line item price. Another aspect of the above embodiment provides for selecting a deal in response to a request to analyze the deal.

The foregoing is a summary and thus contains, by necessity, simplifications, generalizations and omission of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a method, apparatus and system for facilitating consistent application of price polices on every sales transaction supported through a customer relationship management system, in order to identify, evaluate, and approve or disapprove price exceptions in violation of stated corporate pricing objectives. Embodiments of the present invention further enable analysis of an impact of a given price exception against a relevant market segment to aid in identifying revenue and margin impact. Embodiments of the present invention also enable understanding of price erosion, discount effectiveness and margin impact for price exceptions. Having such deal management capabilities coupled with a customer relationship management system enables embodiments of the present invention to reduce the time to identify and evaluate price exceptions that impact revenue and margin. Agents responsible for sales interaction with customers can immediately identify violations of price policies. Those responsible for authorizing exceptions can easily determine the effect of those exceptions upon impacted markets.

Deal Management Architecture in a Customer Relationship Management Environment

Figure 1:
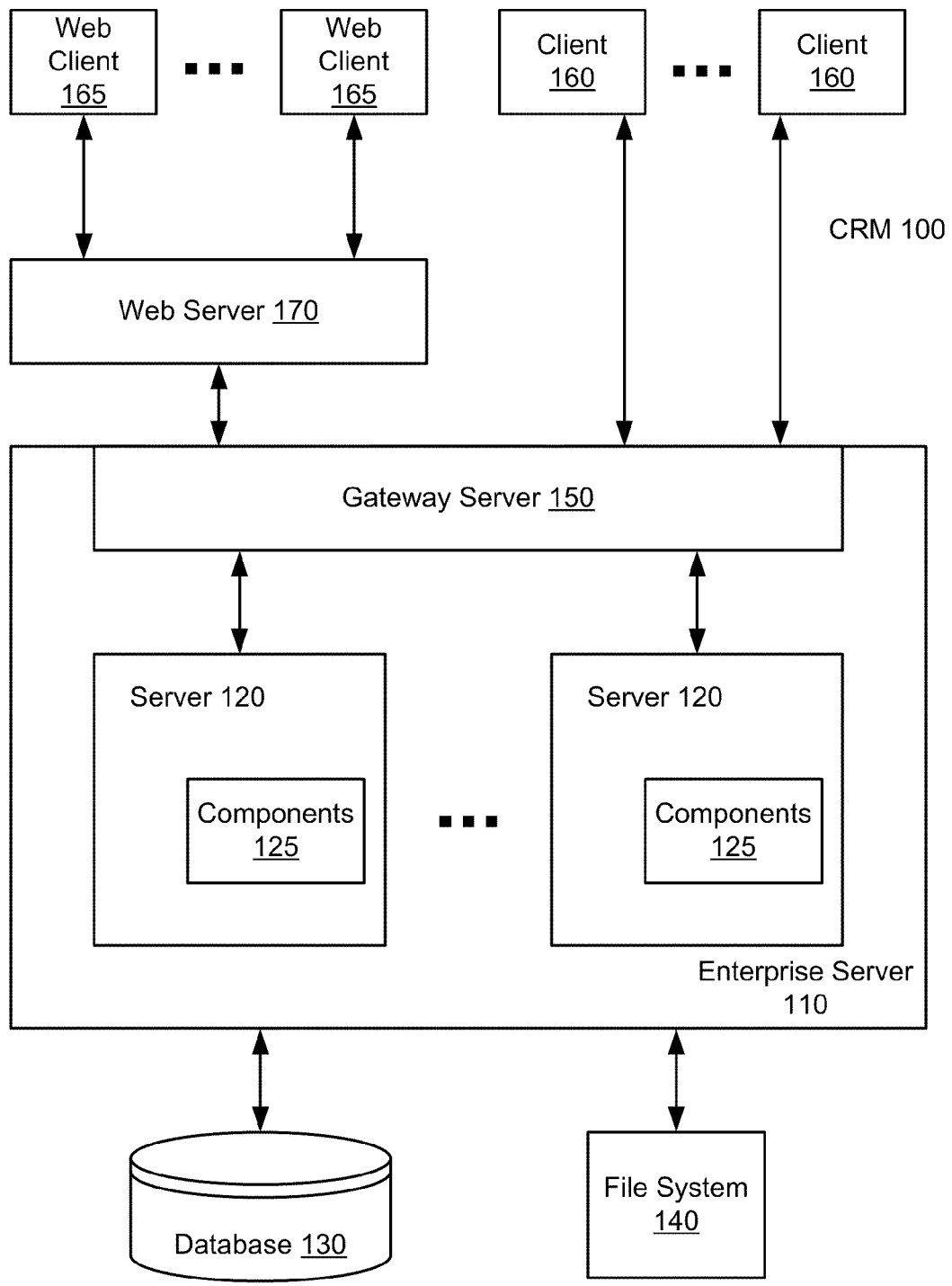
FIG. 1 is a simplified block diagram illustrating a customer relationship management system architecture usable in conjunction with embodiments of the present invention.

FIG. 1 is a simplified block diagram illustrating a customer relationship management architecture usable in conjunction with embodiments of the present invention. The illustrated customer relationship management environment includes an enterprise server 110 that is a logical grouping of one or more servers 120 that support a group of clients (160,165) accessing a common database 130. An enterprise server can be configured, managed and monitored as a single logical group, allowing an administrator to start, stop, monitor or set parameters for servers 120 within enterprise server 110. In such a configuration, parameters for the customer relationship management system can be set at the enterprise server level, and these parameters can apply to every server operating within the enterprise server. In addition, other parameters can be adjusted at a server (120) level to support fine tuning of those parameters. In this hierarchical parameter context, if a parameter is set at a server level, then the server-specific value for the parameter can override an enterprise server-level setting for the parameter. Further, parameter settings at a component level (processes executed on servers 120) will override those set at the server level.

Servers 120 can support back-end and interactive processes for each client accessing the server. These processes are illustrated as one or more components 125 within each server. A server 120 can support, for example, multiprocess and multithreaded components, and can operate components in background, batch, and interactive modes. A server component can also operate on multiple servers 120 simultaneously to support an increased number of users or larger batched workloads. Examples of component processes include, for example, mobile web client synchronization, operation of business logic for web clients, connectivity and access to database and file system for clients, integration with legacy or third-party data (e.g., data not native to the CRM system), automatic assignment of new accounts, opportunities, service requests, and other records, and workflow management. Embodiments of the deal management processes of the present invention can also be implemented to execute on one or more of servers 120 as components.

Servers 120 are coupled to a gateway server 150, illustrated as part of enterprise server 110. Gateway server 150 can coordinate the operations of enterprise server 110 and servers 120. A gateway server can provide persistent storage of enterprise server configuration information, including, for example, definitions and assignments of component groups and components, operational parameters, and connectivity information. A gateway server can also serve as a registry for server and component availability information. For example, a server 120 within enterprise server 110 can notify gateway server 150 of availability. Connectivity information such as network addresses can be stored in a storage accessed by gateway server 150. If a server 120 shuts down or otherwise becomes unavailable, connectivity information related to that server can be cleared from gateway server 150.

Through their relationship in enterprise server 110, servers 120 and their components 125 can access one or more databases 130 and/or file systems 140. Database 130 can store, for example, RDBMS client software and tables, indexes, and data related to all operations impacted by the CRM system. Database information can include, for example, customer information, market data, historical pricing information, current pricing information, contact information, and the like. Similarly, file system 140 can store data and physical files used by clients 160 and 165 and enterprise server 110. File system 140 can be a shared directory, or set of directories on different devices, which is network-accessible to all servers 120 in enterprise server 110. In order for a client to gain access to files in file system 140, a client can connect to an appropriate server 120 to request file uploads or downloads. Server 120 can then access file system 140 using, for example, a file system management component.

As stated above, embodiments of the deal management processes of the present invention can be implemented to execute as components on one or more of servers 120, accessing database 130 to store and retrieve data. An alternative embodiment provides a separate server accessible by the same or different web server. The separate server can provide access to database 120, and thereby providing access to deal management information to other component processes through enterprise server 110.

Clients 160 and 165 provide access to enterprise server 110 for agents using the customer relationship management system. Clients communicate to enterprise server 110 through gateway server 150 either directly (e.g., client 160) or via a web server 170 (e.g., clients 165). A web server 170 can provide a mechanism by which enterprise server 110 can respond to web-based requests (e.g., HTML, XML, and the like). Web clients 165 can include clients coupled to web server 170 via a local area network, metro-area network or wide area network and propagated over a variety of communications media, as discussed above. Further, web clients 165 can include mobile clients accessing web server 170 through wireless communications means. Users of clients 160 and web clients 165 can include, for example, sales agents, service agents, customer representatives, managers of the business entity using the CRM, and the like. Users have access to all information accessible to enterprise server 110 in database 130, as controlled by a user's secured access rights.

Specifically, users of embodiments of the present invention include, for example, price administrators who create pricing strategies that can influence price negotiation processes, sales representatives who can select a pricing strategy previously provided by a price administrator that satisfies an account and conditional-deal specific designations and who can quote and negotiate a quote with an entity corresponding to the account, and price approvers who review price exceptions generated during the deal process and detected and displayed by embodiments of the present invention.

Figure 2:
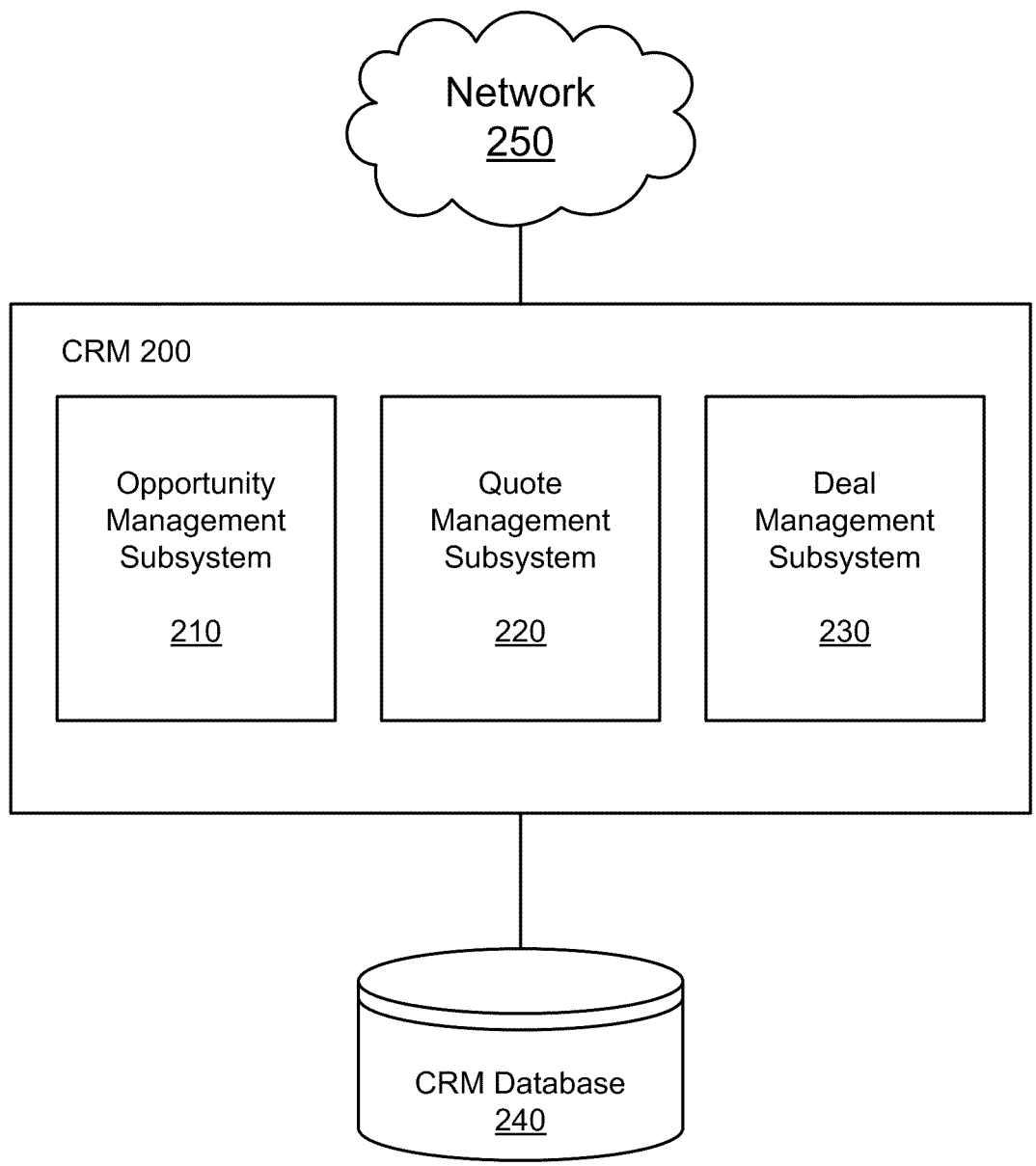
FIG. 2 is a simplified block diagram illustrating a logical configuration of a customer relationship management system 200, incorporating embodiments of the present invention.

FIG. 2 is a simplified block diagram illustrating a logical configuration of a customer relationship management system 200 incorporating embodiments of the present invention. As discussed above, embodiments of customer relationship management system 200 can be implemented by enterprise server 110 described in FIG. 1. Customer relationship management system 200 is illustrated as including subsystems that provide functionality for opportunity management (210), quote management (220), and deal management (230). Customer relationship management system 200, including all integrated subsystems, can access and store data in a customer relationship management database 240, corresponding to one or more of database 130 and file system 140. It should be noted that although FIG. 2 illustrates the customer relationship management system as including the three subsystems discussed above, additional subsystems providing additional functionality can also be incorporated in the customer relationship management system. Further, the described capabilities of the subsystems can be combined into one or the other of the individual subsystems. Each subsystem of the customer relationship management system can be implemented as one or more components 125, as discussed above with regard to FIG. 1.

Opportunity management subsystem 210 provides a user of customer relationship management system 200 a mechanism for entering and accessing information related to a customer opportunity. The opportunity management subsystem can provide, for example, user interface screens that lead a user through a workflow allowing input of all data necessary to identify a customer and the nature of an opportunity associated with that customer. In addition, the opportunity management subsystem can provide a user with the opportunity to associate the customer related to the opportunity with similar customers serviced by the entity using the customer relationship management system. As will be discussed in greater detail below, associating a customer with such a segment of the customer population of the entity can aid in analyzing deals for particular items in light of similarly situated customers. A user interface associated with the opportunity management subsystem can provide, for example, access to pre-defined segment descriptors to be associated with a customer (e.g., through the use of drop-down menus). These pre-defined customer segments can be created and maintained, for example, by an administrative subsystem of deal management subsystem 230, as will be discussed in greater detail below. Tables and other data associated with customer segments are stored in customer relationship management database 240 and are accessible by each subsystem of customer relationship management system 200.

Quote management subsystem 220 can provide a mechanism by which a user (e.g., a sales representative) can enter parameters of a proposed quote for a customer. In addition, quote management subsystem 220 can provide real-time analysis of the proposed quote parameters in light of information associated with the customer segment associated with the customer, showing whether the proposed quote is acceptable in light of those customer parameters. For example, a customer segment can have an acceptable range of prices for a particular product represented as a line item in a quote. If the proposed quote parameters (e.g., a discount) result in a quoted price for a line item outside the acceptable range for the customer segment, the quote management subsystem can flag that line item. In addition, an overall analysis of the quote itself, encompassing all the line items, can also be performed and result in a flag. Embodiments of the quote management subsystem can also provide for a user to select a pricing segment for the customer based upon whether there are multiple pricing segments associated with the customer segment. In order to perform such real-time analysis of proposed quotes, quote management subsystem 220 has access to tables created by deal management subsystem 230 stored in customer relationship management database 240. These tables include relationships between a customer and customer segments and further details related to those customer segments, as will be discussed more fully below.

Deal management subsystem 230 can provide for maintaining and administrating various tables and data associated with deal management stored in customer relationship management database 240. These tables and data can include definitions of customer segments, pricing guidelines and terms associated with such guidelines, and pricing strategy. In addition, deal management subsystem 230 can provide a mechanism for pricing administrators to review, authorize and modify proposed quotes falling outside of a pricing strategy associated with a customer's segment. Deal management subsystem 230 can provide this functionality through, for example, a workbench utility displaying information such as pricing waterfalls, comparison quotes, and the like. Deal management subsystem 230 can provide such functionality through access to not only deal management data stored in customer relationship management database 240, but also by accessing opportunity and quote information stored in database tables by opportunity management subsystem 210 and quote management subsystem 220. Integration of the data from all the customer relationship management system subsystems in customer relationship management database 240 enables, in part, the real-time analysis provided by embodiments of the present invention.

Creating Pricing Strategies

Pricing strategies are pricing policies for a business entity. Pricing strategies influence price negotiation processes conducted by sales representatives and can determine the latitude for action that a sales representative has when negotiating prices for a quote or order. Should a sales representative enter a negotiated price that is lower than or equal to a price associated with a pricing strategy, a price exception will result. To create a pricing strategy, price administrators first create the pricing strategy elements, such as pricing criteria, pricing segments, guideline plans, and price lists, and then use these elements to define a pricing strategy. Embodiments of the present invention enable a pricing administrator to create, configure and define a pricing strategy using all these elements.

Figure 3:
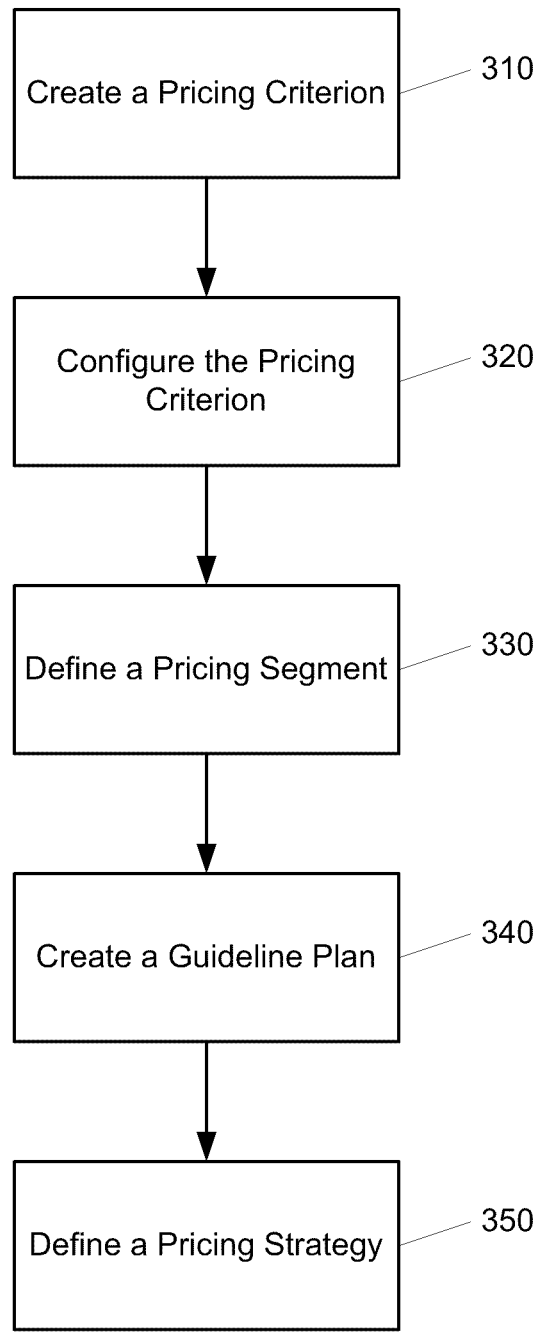
FIG. 3 is a simplified flow diagram illustrating a process for creating a pricing strategy, in accord with embodiments of the present invention.

FIG. 3 is a simplified flow diagram illustrating a process for creating a pricing strategy, in accord with embodiments of the present invention (e.g., using deal management subsystem 230). As an initial step, price administrators create a pricing criterion that represents characteristics of a customer or a deal (310). Pricing criteria are key factors in determining pricing strategy for a business entity. Values for the pricing criteria are used in the subsequent steps related to defining pricing segments and pricing strategy. Embodiments of the present invention can use, for example, two categories to define pricing criteria: primary and conditional-deal specific. A primary category can represent characteristics of a customer account, including, for example, customer value, pricing criteria industry, geography, channel (e.g., consumer, distributor, OEM, retailer, systems integrator), and cost-to-service (e.g., the cost to service the customer account). A conditional-deal specific criteria can represent the characteristics of a deal, which can be used to define pricing strategies. Examples of conditional-deal specific criteria include, for example, deal type (e.g., quote and order) and competitor. Embodiments of the present invention can provide an interface by which a pricing administrator can review currently entered pricing criteria and to create new criteria, as appropriate. New criteria can then be stored in an appropriate database table.

Once a pricing criterion has been created, embodiments of the present invention can then enable a pricing administrator to configure the pricing criterion (320). Embodiments of the present invention provide a pricing administrator tools by which tables stored in CRM database 240 (discussed below) can be modified to reflect new primary criteria and conditional-deal specific criteria associated with the pricing criterion.

Embodiments of the present invention further provide a mechanism for defining a pricing segment (330) which represents groups of customer accounts. Such groups can be based upon common buying and purchasing behavior of customers in the group. Therefore, similar pricing policies can apply to customer accounts in a pricing segment. Pricing segment definitions designate a unique set of customer accounts. Pricing segments can be defined by selecting an available value for each of the primary criteria. Embodiments of the present invention enable such defining of a pricing segment by enabling a pricing administrator to name a pricing segment and to select a value for each of the primary criterion fields and then storing that information in database 130. As new customer opportunities are added to the customer relationship management system (e.g., using opportunity management subsystem 210), the customer can be associated with an appropriate pricing segment. This customer-segment association can be made by the person originating the opportunity, a sales administrator, or deal management administrator, as appropriate in light of the security needs of the system and business needs of the entity.

Guideline plans determine pricing adjustments that sales representatives are allowed to negotiate when creating quotes and orders. Pricing for a guideline plan can apply to a line item in a quote, to a line item in an order, or to the entire quote or order (e.g., a deal). Embodiments of the present invention enable a pricing administrator to create a guideline plan when creating a pricing strategy (340). Embodiments of the present invention can provide for a pricing administrator selecting a type of guideline plan (e.g., product type or deal type), a sequence number for the line item term, a role of a user who can negotiate pricing for a quote and order, a geographic area for a customer account on a quote or order (restricting areas in which the guideline plan is effective), constraints, products, product lines, product classes, and date restrictions for line item type guideline plans. For deal-type guideline plans, terms can include, for example, the role of a user who can negotiate pricing for a quote and order, geographic territory restrictions, constraints, date restrictions, minimum and maximum deal values and a percentage associated with a deal value.

Guideline plan terms can also relate to a list of adjustments used to calculate the final price for a quote or an order line item (e.g., a waterfall). These waterfall adjustments can consist of adjustments that the pricing engine calculates and adjustments that the sales representative enters. Waterfall segments can include, a ceiling (highest published price for a quote, order, or line item), segment (price that a company offers to customers in a pricing segment for a quote, order, or line item), invoice (price that the customer pays for a quote, order, or line item calculated by subtracting negotiated discounts, volume discounts, and other on-invoice discounts from the segment price), pocket price (final price that a company realizes for a quote, order, or line item calculated by subtracting off-invoice adjustments from the invoice price), and pocket margin (price associated with the profit that the company realizes for a quote, order, or line item calculated by subtracting the cost from the pocket price).

Finally a pricing strategy can be defined (350) using the pricing strategy elements of pricing criteria, pricing segments, guideline plans and price lists. Embodiments of the present invention provide a mechanism by which a pricing administrator can select the criterion, pricing segments, guideline plans, and price lists for the pricing strategy that are then stored by database 130.

Once the pricing strategies have been entered using embodiments of the present invention, embodiments of the present invention further allow the business entity to define and administer pricing strategies in a single location allowing for dissemination of these pricing strategies throughout the CRM environment. Embodiments of the present invention reduce the need to integrate data across disparate systems and allow for a consistent user experience. A business entity can define and administer price policies, price lists, product/service offerings, and sales workflow inclusive of pricing approval within the same solution.

Deal Management Data Model

Embodiments of the present invention provide for a customer relationship management system having a set of deal management data tables and storage that is integrated with tables and storage used by other CRM subsystems. In this manner, not only can each subsystem of the customer relationship management system access deal management data, but also user security and other management tasks can be centralized and coordinated within the CRM system.

Figure 4:
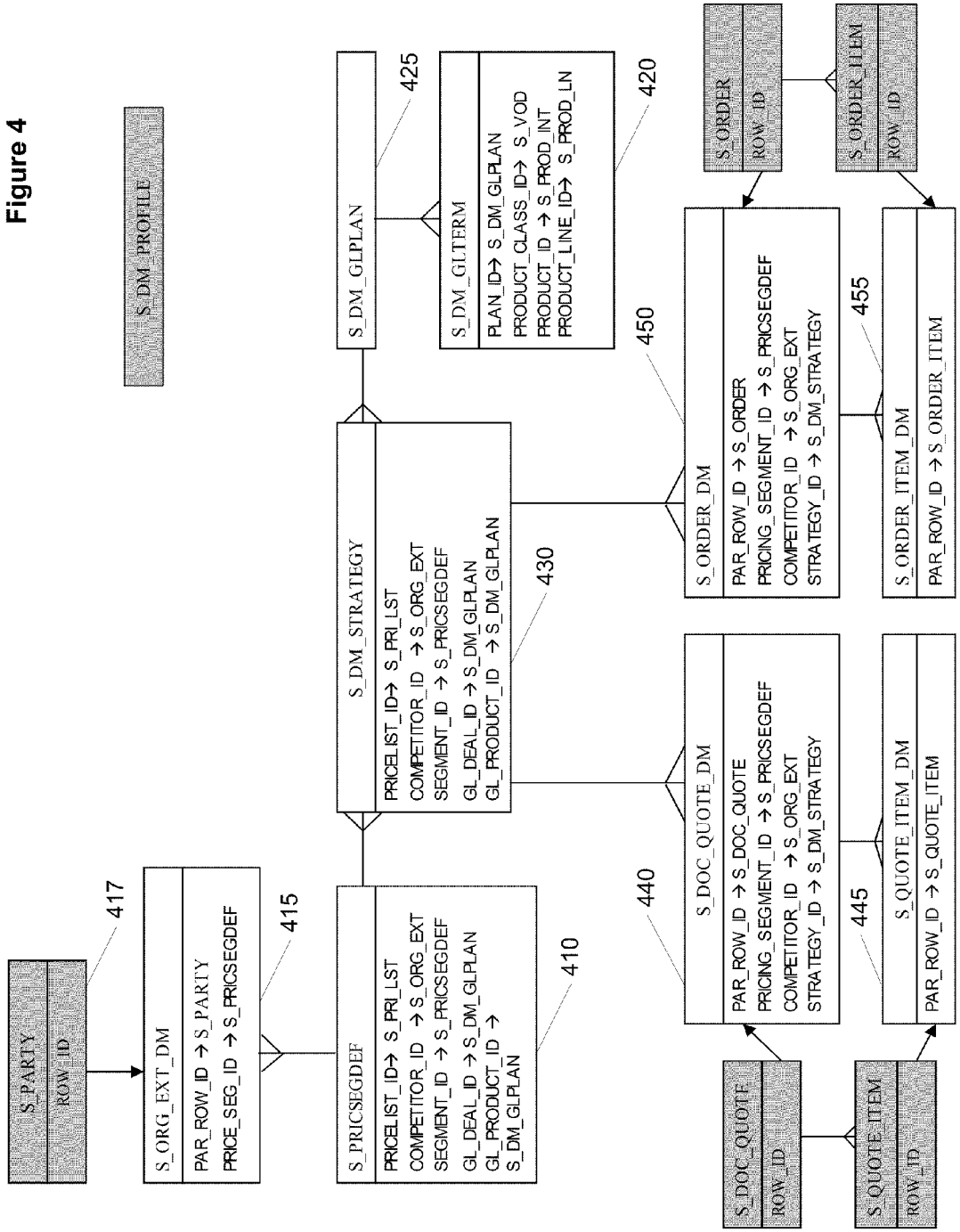
FIG. 4 is a simplified block diagram illustrating one example of a deal management data model usable to implement embodiments of the present invention.

FIG. 4 is a simplified block diagram illustrating one example of a deal management data model usable by embodiments of the present invention. FIG. 4 illustrates not only connectivity of the various deal management tables, including foreign keys from one table to another, but also an example relationship between the deal management tables and non-deal management tables (as illustrated by shading on the non-deal management table names (e.g., S_PARTY, S_DOC_QUOTE, and S_QUOTE_ITEM)).

As discussed above, tables provided by a deal management subsystem 230 define elements of pricing strategies that influence price negotiation processes. Elements of such pricing strategies include pricing criteria, pricing segments, guideline terms and guideline plans. Tables illustrated in FIG. 4 provide storage and relationships between that storage for the pricing strategy elements. It should be understood that embodiments of the present invention are not limited to the tables, relationships, or the data definitions illustrated in FIG. 4 and that these tables are provided for illustrative purposes. Data stored in the deal management tables can be provided, as discussed above, by a pricing administrator and is intended to be consistent across an enterprise as disseminated by the customer relationship management system.

As discussed above, in order to apply consistent pricing for customers having similar characteristics, a pricing segment can be created that associates desired characteristics with a segment that can then be associated with a group of customers having those characteristics. Primary pricing criteria aid in the definition of pricing segments. As illustrated in FIG. 4, S_PRICESEGDEF table 410 stores these primary pricing criteria as tabular columns Each row of S_PRICESEGDEF 410 is a defined segment. A deal management system can have several pre-defined pricing criteria that are commonly used by business entities (e.g., industry type and geography) and can also provide for customization of primary pricing criteria through the addition of columns to table S_PRICESEGDEF 410.

Figure 5:
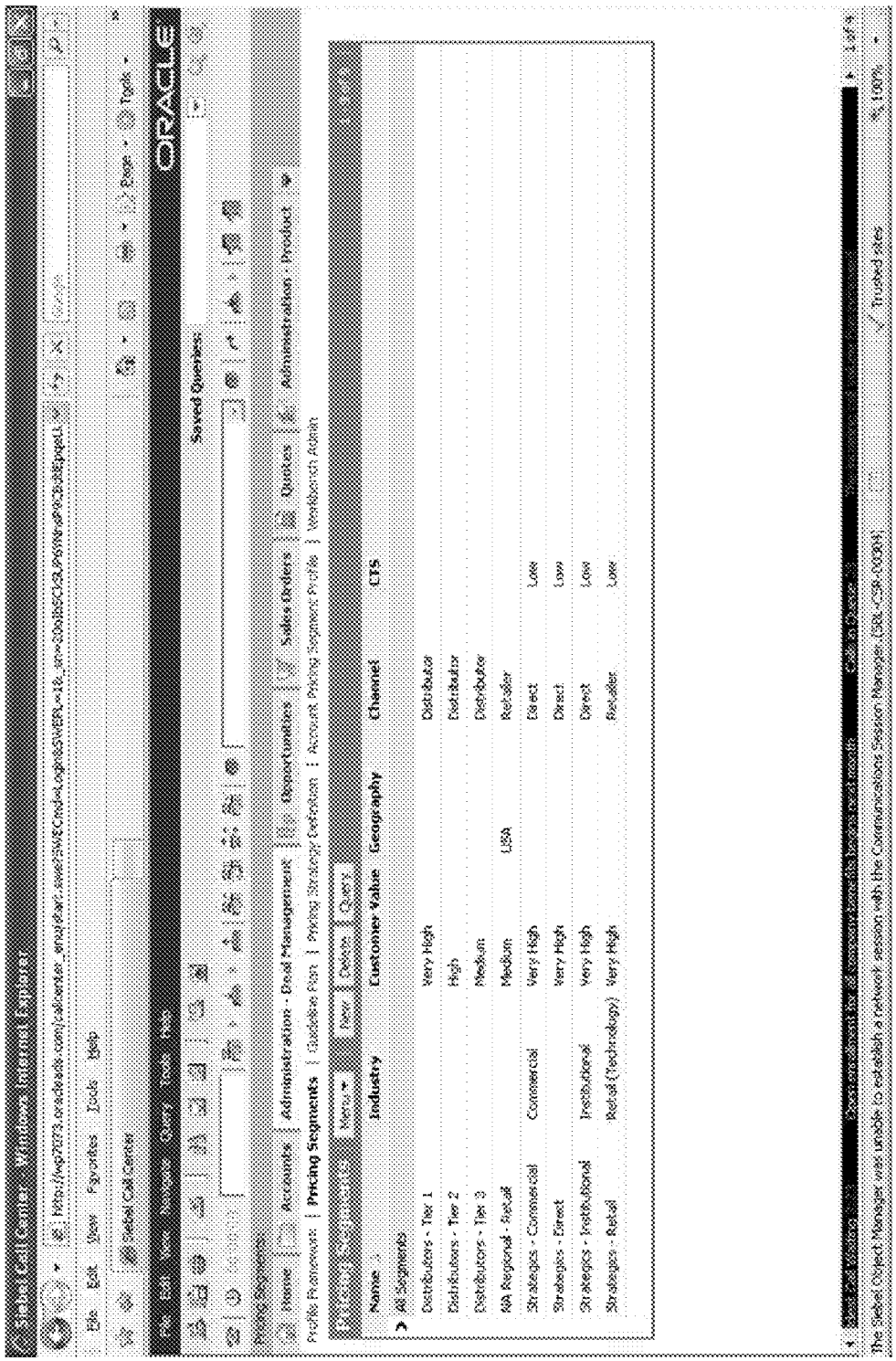
FIG. 5 illustrates a user interface screen providing an example of definitions of pricing segments with primary pricing criteria.

FIG. 5 illustrates a user interface screen providing an example of definitions of pricing segments (listed as rows) with primary pricing criteria (illustrated as columns) FIG. 5 illustrates pricing criteria including "Industry," "Customer Value," "Geography," "Channel," and Cost-to-Serve ("CTS"). The various pricing segments (listed under "Name") are defined by various values of the listed pricing criteria. For example, the pricing segment "Distributors-Tier Two" is defined by having a customer value of "high" and a channel type of "distributor." As another example, the pricing segment "Strategics-Commercial" is defined by an industry type of "commercial," a customer value of "very high," a channel type of "direct," and a cost-to-serve of "low."

Once the pricing segments have been defined in table S_PRICESEGDEF 410, those pricing segments can then be associated with customers that are either already stored in the customer relationship management system or those who are subsequently introduced into the customer relationship management system (e.g., via an opportunity management subsystem 210). Information relating customers with segment types is provided in table S_ORG_EXT_DM 415. Table S_PARTY 417 can provide the customer list used by all subsystems of the customer relationship management system.

Figure 6:
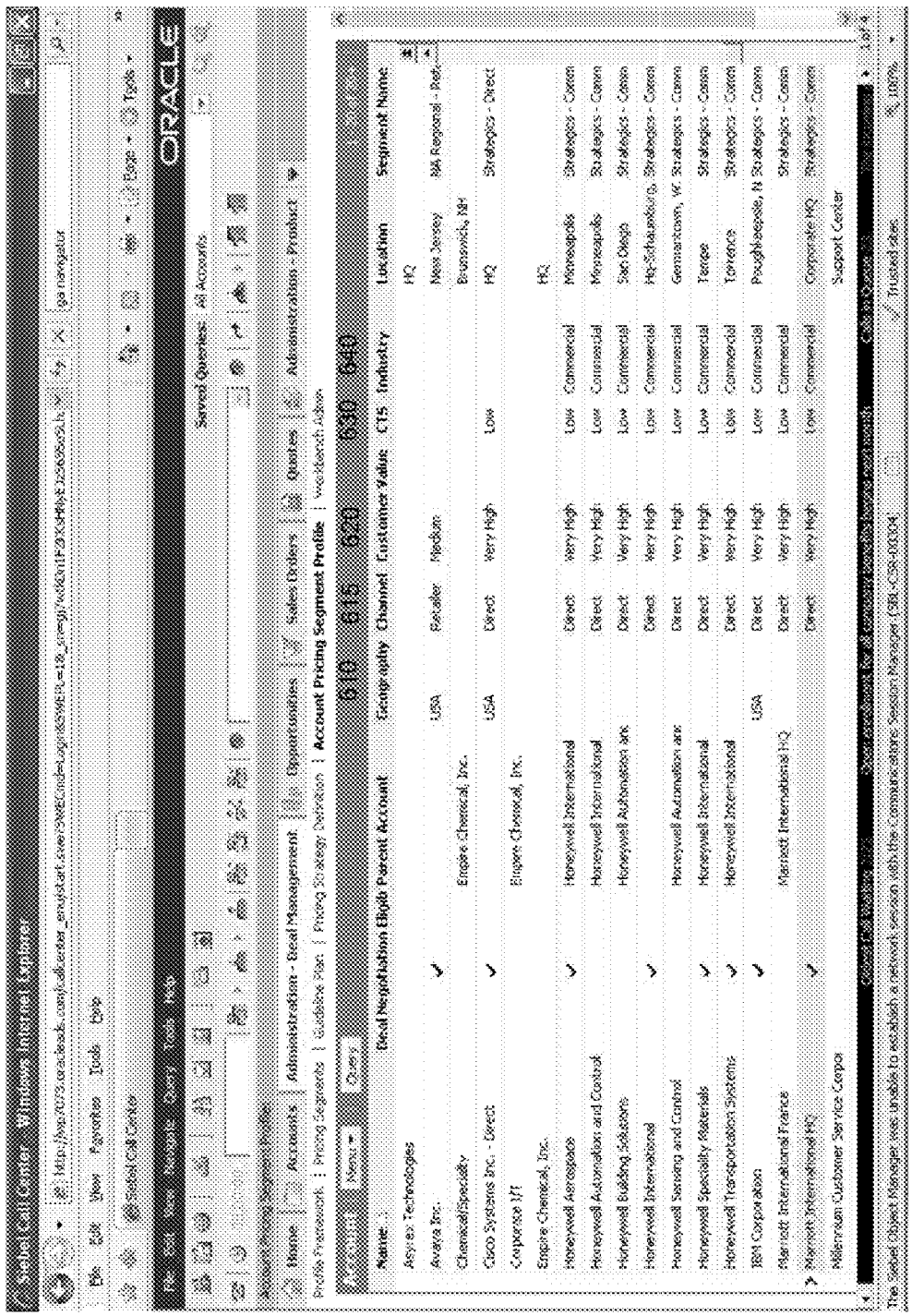
FIG. 6 illustrates a user interface providing an example of an association between customer accounts and pricing segments.

FIG. 6 illustrates a user interface providing an example of an association between customer accounts and pricing segments. Columns 610, 615, 620, 630 and 640 correspond to similarly identified columns from FIG. 5 (e.g., Geography, Channel, Customer Value, CTS, and Industry). These are the identified pricing segments. In addition, identifiers are associated with the various accounts defined in the customer relationship management system. Accounts (listed under "Name") can be associated with a pricing segment (listed under "Segment Name"). Accounts can be associated within the customer relationship management system with other accounts in a parent-child relationship, as indicated by the "Parent Account" column in FIG. 6. Child accounts can have their own segment identification or can inherit their parent's segment association, as indicated in FIG. 6 by a checkmark in the "deal negotiation eligible" column. Thus, a child account can be defined to have different deal negotiation characteristics as defined by a different associated price segment.

In addition to providing pricing segments to associate various customers with one another for similar treatment, a deal management subsystem can also provide for guideline plans that determine pricing adjustments sales representatives are allowed to negotiate when creating quotes and orders. These guideline plans can apply to line items in a quote or to an entire quote or order. Data associated with such guideline plans can also be stored in deal management tables illustrated in FIG. 4. Table S_DM_GLTERM 420 can store the guideline terms associated with each guideline plan. Those terms can then be associated with a defined plan in Table S_DM_GLPLAN 425.

Figure 7:
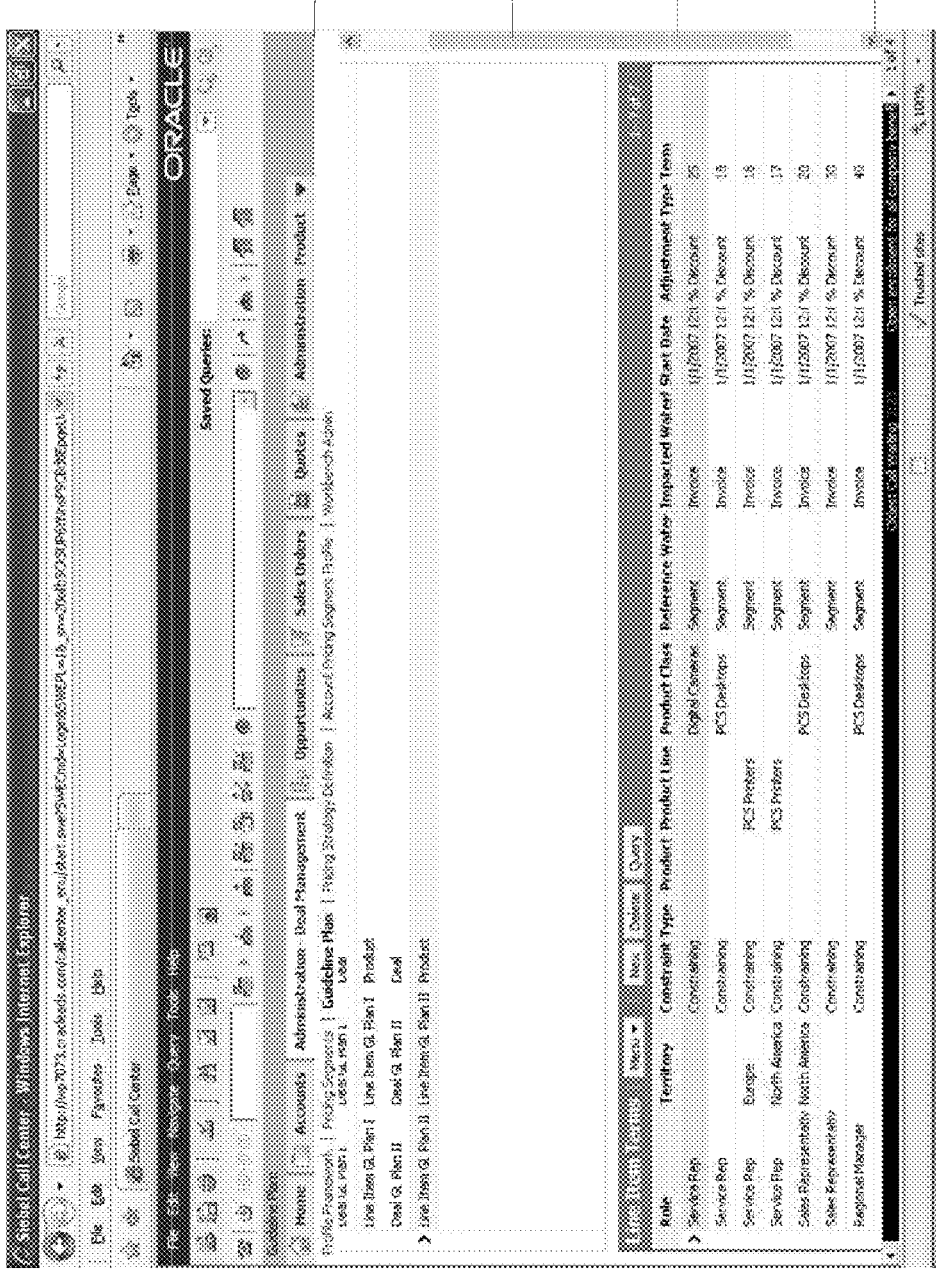
FIG. 7 illustrates a user interface providing an example of guideline terms associated with one of a set of guideline plans.

FIG. 7 illustrates a user interface providing an example of guideline terms 710 associated with one of a set of guideline plans 720 ("line item GLPLAN II"). The information illustrated in section 710 of FIG. 7 is provided from a guideline term table (e.g., table S_DM_GLTERM 420). The columns represent fields associated with, in this case, a line item guideline plan. The following table provides an example of fields that can be used to define a guideline term.

| Field | Description |
| --- | --- |
| Role | The role of the user who can negotiate pricing for a quote and order. If no value is selected, the pricing term for the line item applies to all users. |
| Territory | The geographic area for the customer account on the quote or order. The values selectable for this field are the same as those selected for the region field in the S_PRICESEGDEF Table. If no value is selected, the pricing term for the line item applies to all territories. |
| Constraint Type | The nature of a price exception for the pricing term:<br>Constraining: a sales representative will see a red square in a guideline field after entering a price for a quote or order that is lower than or equal to the minimum price associated with the pricing term for the line item.<br>Recommended: sales representative sees a yellow square in the guideline field after entering a price break quote or an order that is lower than or equal to the minimum price associated with the pricing term for the line item.<br>In the quote management subsystem, if a quote line item is flagged red, the sales representative cannot convert the quote to an order until a price approver handles the price exception. A red flag indicates that the sales representative violated a pricing policy. A yellow flag is a cautionary indicator and does not prevent the sales representative from further processing the quote or order. |
| Product | The product for the pricing term. If no product value is selected, the pricing term for the line item applies to all products. |
| Product Line | The product line for the product. If no value is selected, the pricing term for the line item applies to all product lines. |
| Product Class | The product class for the product. If no value is selected, the pricing term for the line item applies to all product classes. |
| Reference Waterfall Segment | The waterfall segment to which the pricing term applies. The price that is associated with the pricing term for this waterfall segment is compared to the price for the impacted waterfall segment on a quote or an order. If the price that is associated with the pricing term for this waterfall segment is higher than or equal to the price for the impacted waterfall segment, a price exception results.<br>Values in this field can include ceiling and segment. When a price administrator configures waterfall segments, the price administrator can configure other values. |
| Impacted Waterfall Segment | The price on this waterfall segment on a quote or an order price is compared to the price that is associated with the pricing term for the reference waterfall segment. Values for this field can include invoice, pocket, and pocket margin. When a price administrator configures waterfall segments, the price administrator can configure other values. |
| Start Date | The date and time the pricing term begins. |
| End Date | The date and time the pricing term ends. |
| Adjustment Type | The nature of the adjustment for the pricing term. Values include percent discount and price override. |
| Term | The value that is associated with the adjustment. For example, for a percent discount adjustment type, term will be the percentage of the percent discount. |

Section 710 of FIG. 7 illustrates values that can be associated with a product type guideline plan. As discussed above, guideline plans can also include deal-type guideline plans wherein the guideline plan is associated with the entirety of a deal rather than just an individual product within the deal. Deal type guideline plans can include many fields similar to those described above with regard to product-type guideline plans. In addition, deal-type guideline plans can include a lowest value in a deal value range ("deal min") and a highest value in the deal value range ("deal max"). A term can be provided that is a percentage associated with the deal value range. As discussed above, table S_DM_GLPLAN 425 can include associations of various guideline terms for a plan. Various plans are listed in section 720 of FIG. 7.

Once pricing strategy elements such as pricing criteria, pricing segments, line item guideline plans, deal guideline plans and price lists have been created, as discussed above, or defined elsewhere within a customer relationship management system (as in the case of price lists), those pricing strategy elements can be used to define a pricing strategy. Table S_DM_STRATEGY 430 can contain the relationships between the various pricing strategy elements that define the pricing strategies of the enterprise.

Figure 8:
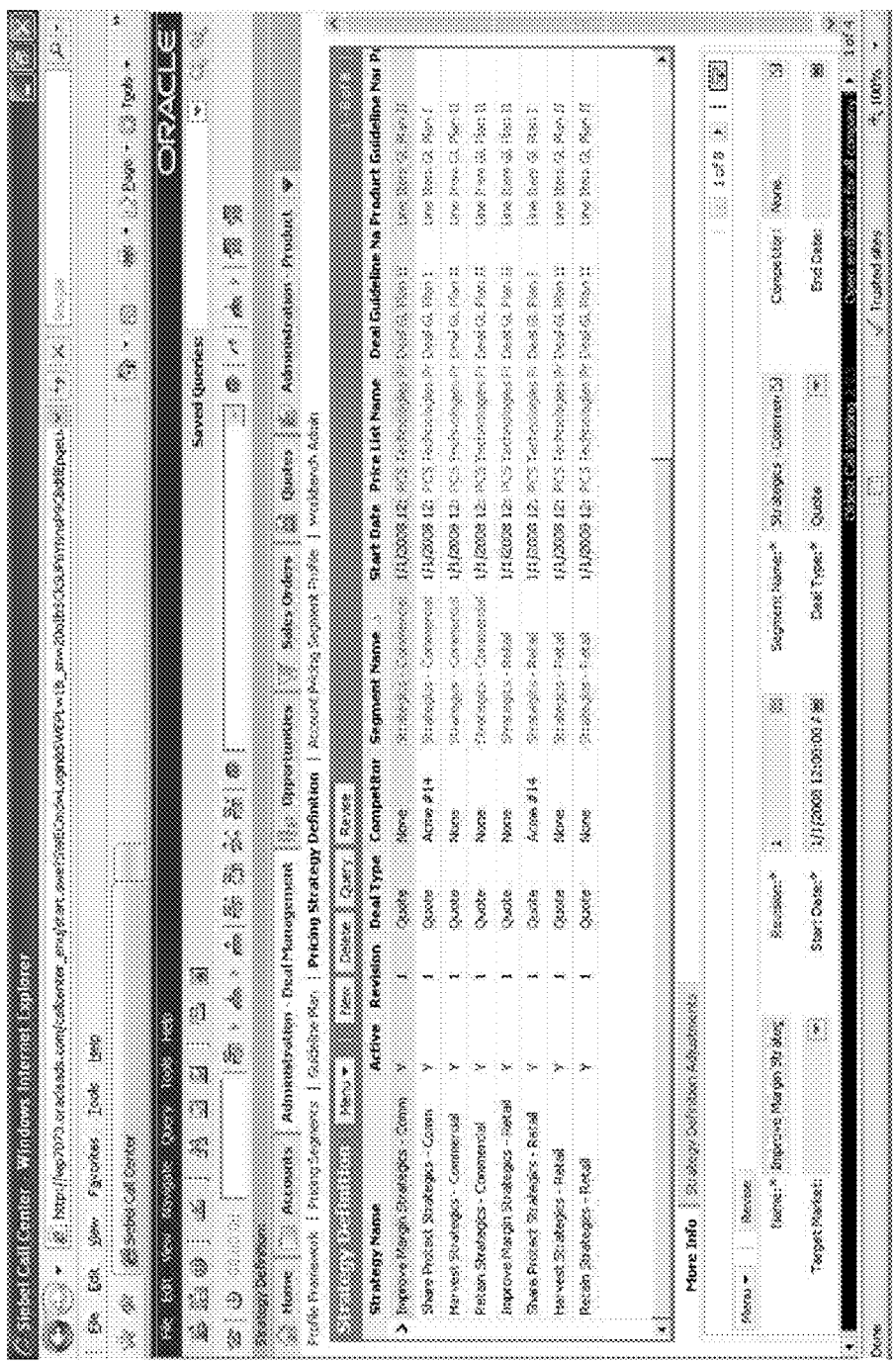
FIG. 8 illustrates a user interface displaying an example of data that can be found in a pricing strategy table, in accord with one embodiment of the present invention.

FIG. 8 illustrates a user interface displaying an example of data that can be found in table S_DM_STRATEGY 430. As shown in FIG. 8, several defined strategies are listed under a variety of strategy names (e.g., "Improve Margin Strategics-Commercial," "Harvest Strategics-Commercial," and "Share Protect Strategics-Retail"). Some of the fields illustrated in the pricing strategy definition view of FIG. 8 are defined by the following table.

| Field | Description |
| --- | --- |
| Active | If this field is checked for a pricing strategy, sales representatives can select that strategy when creating quotes and orders. A deal management administrator cannot change the data in the fields for that strategy once the strategy is active. |

-continued

| Field | Description |
| --- | --- |
| Revision | This is the version number that is populated automatically for the defined pricing strategy. Newly defined pricing strategies are populated with a version number of 1. The first pricing strategy created by revising a pre-existing pricing strategy is populated with a version number of 2. Subsequent pricing strategies that can be created by revising pre-existing strategies can be populated with a version number of 3, 4, and so on. |
| Segment Name | The name of the pricing segment for the pricing strategy. |
| Start Date | The date and time the pricing strategy begins. |
| End Date | The date and time the pricing strategy ends. |
| Price List Name | The identifying name of a price list for the pricing strategy. If this price list contains ceiling prices, this list designates ceiling prices. If this price list does not contain ceiling prices, this list designates segment prices. |
| Deal Guideline Name | The name of the deal guideline plan for the pricing strategy. |
| Product Guideline Name | The name of the line item guideline plan for the pricing strategy. |

As illustrated in FIG. 8, additional fields can be defined and used in a pricing strategy definition table including, for example, associating a particular strategy definition with a particular type of deal (e.g., quote or order) and associating a strategy with a named competitor of the enterprise. As with other tables described herein, embodiments of the present invention are not limited to tables including the terms or items illustrated, but instead the tables are provided as examples of types of values and their interrelationships.

The deal management data model illustrated in FIG. 4 also provides for tables that define those fields which are displayed to a user when generating a quote or order, for example. For example, if additional pricing segments or pricing strategies are added, the ability to provide those segments or strategies to a user generating a quote or order can be provided by modifying Tables S_DOC_QUOTE_DM 440 and S_ORDER_DM 450 for a quote or order, respectively. Similarly, Tables S_QUOTE_ITEM_DM 445 and S_ORDER_ITEM_DM 455 define those fields that can be displayed for individual line items within a quote or an order, respectively.

Price Enforcement

One advantage embodiments of the present invention exhibit by combining a deal management data model, such as described above, with a data model already present in a CRM system (e.g., 200) is that analysis of a quote or order can be provided to a sales representative as the sales representative is entering criteria related to the quote or order. In this manner, price enforcement in line with pricing criteria can be provided throughout an enterprise, as defined by pricing administrators. In addition, should a quote or order stray from a defined pricing strategy associated with a customer, that quote or order can be flagged for follow up by a price approver who can review those price exceptions and provide feedback to the sales representative or customer regarding the pricing exception.

Price enforcement analysis begins with entry of a quote or order by the sales representative. An assumption is made that a particular customer has already been defined within an opportunity management subsystem 210 and information related to that customer is available to the sales representative.

Figure 9A:
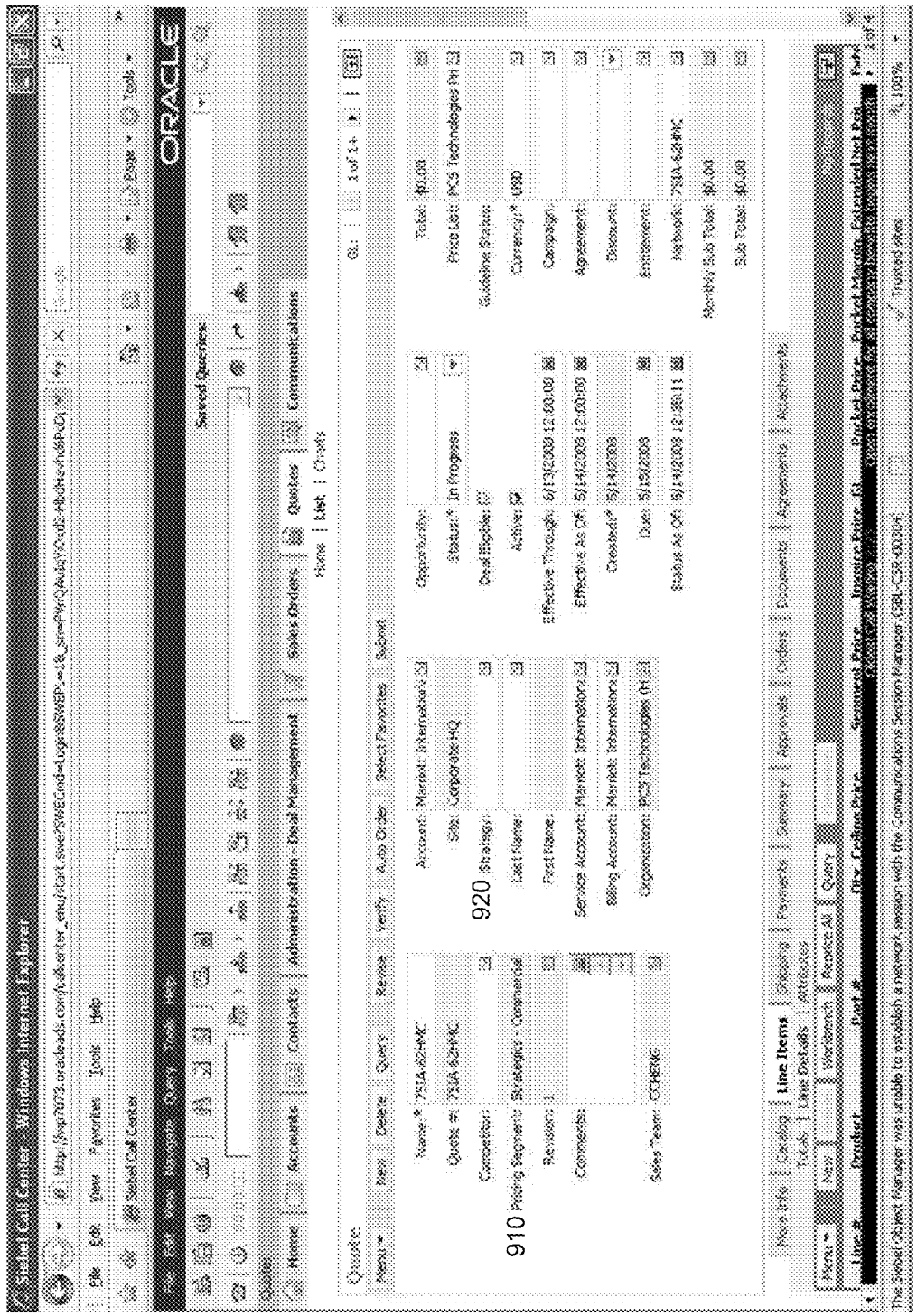
FIG. 9A illustrates an example of a user interface that can be provided by embodiments of the present invention and used to enter a quote or order by a sales person.

FIG. 9A illustrates an example of a user interface that can be provided by embodiments of the present invention and used to enter a quote or order by a sales person. The view illustrated by FIG. 9A is a quote header showing information such as an account name of the quote (e.g., "75IA-62HMC") and a quote number. Much of the information displayed in the quote header of FIG. 9A is the same as would normally be displayed by a customer relationship management system during the quote phase. In addition, as defined by tables such as S_DOC_QUOTE_DM 440, other fields such as "pricing segment" and "strategy" are provided. In the example provided by FIG. 9A, pricing segment field 910 shows that the account is associated with pricing segment "Strategics-Commercial." Such an association can be made by a deal management administrator when defining the various accounts in the account pricing segment profile illustrated in FIG. 6, for example. In general, a sales representative handling entry of a quote or order would not be able to change the pricing segment provided in field 910.

Figure 9B:
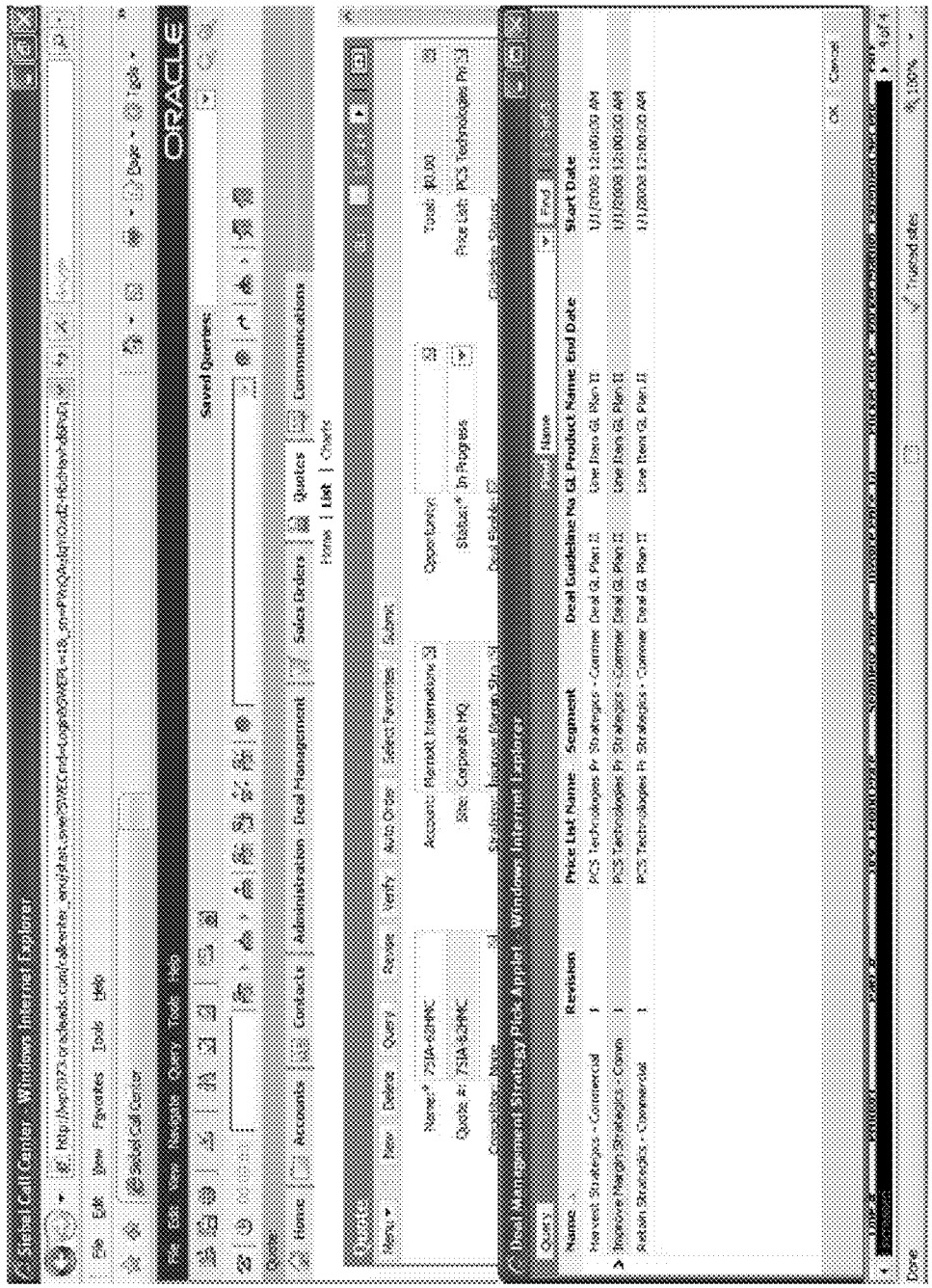
FIG. 9B illustrates an example of a user interface that can be provided by embodiments of the present invention to select an appropriate deal management pricing strategy.

FIG. 9B illustrates an example of a user interface that can be provided by embodiments of the present invention to select an appropriate deal management pricing strategy. As discussed above, pricing segments and pricing lists can be associated with more than one pricing strategy. By selecting the "Strategy" field 920 of FIG. 9A, an applet can be activated which displays those pricing strategies available for the order being entered. A sales representative can use a variety of criteria associated with the customer and the nature of the deal (e.g., whether a competitor is involved) in selecting an appropriate deal strategy.

Figure 9C:
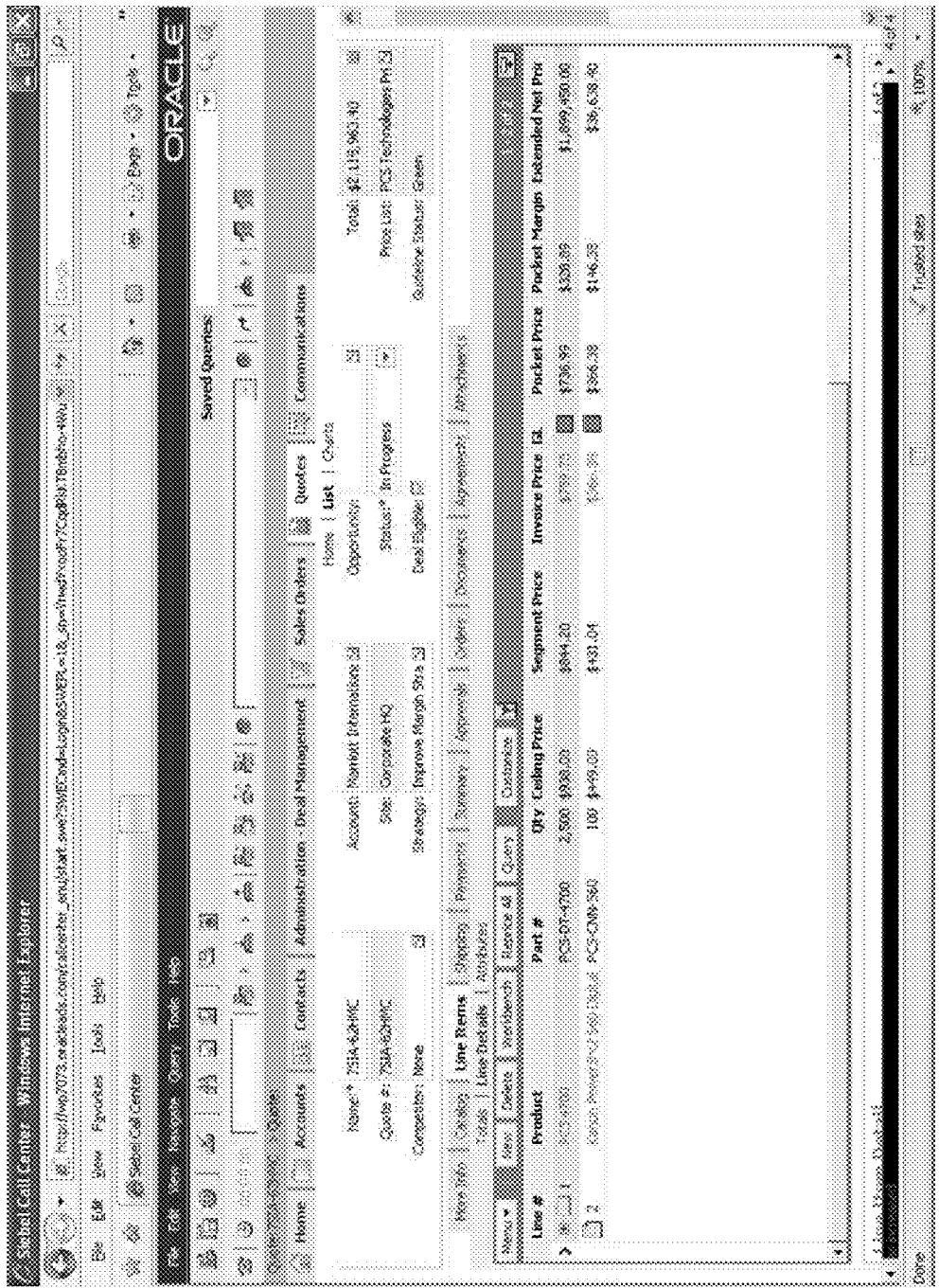
FIG. 9C illustrates an example of a user interface that can be provided by embodiments of the present invention for entering line items associated with a quote or order.

FIG. 9C illustrates an example of a user interface that can be provided by embodiments of the present invention to a sales person for entering line items associated with a quote or order. Once a pricing strategy has been selected for a particular deal or order, the sales person can enter the line items associated with the deal or order. As shown in FIG. 9C, for each entered line item, information related to that item can be displayed. In the example provided by FIG. 9C, waterfall price point information is displayed for each item. For example, ceiling price (e.g., the highest published price), segment price (e.g., a starting price offered to customers in the pricing segment), invoice price (e.g., a price minus all discounts on invoice), pocket price (e.g., invoice price minus off-invoice adjustments), and pocket margin (e.g., realized profit of the enterprise for the particular line item) are displayed.

In addition to the information related to the customer and pricing strategy and the various line items, the user interface display illustrated by FIG. 9C includes a guideline indicator ("GL") that graphically flags whether the invoice price for the item is within the discounting policy set up in the deal management subsystem. The guideline indicator provides the sales representative immediate feedback as to whether the parameters proposed for the deal are acceptable in light of the defined pricing strategies associated with the deal. As discussed above with respect to FIG. 7, the guideline indicator can be tied to the nature of the price exception for the pricing term (e.g., violation of a "constraining" guideline or a "recommended" guideline).

Figure 10:
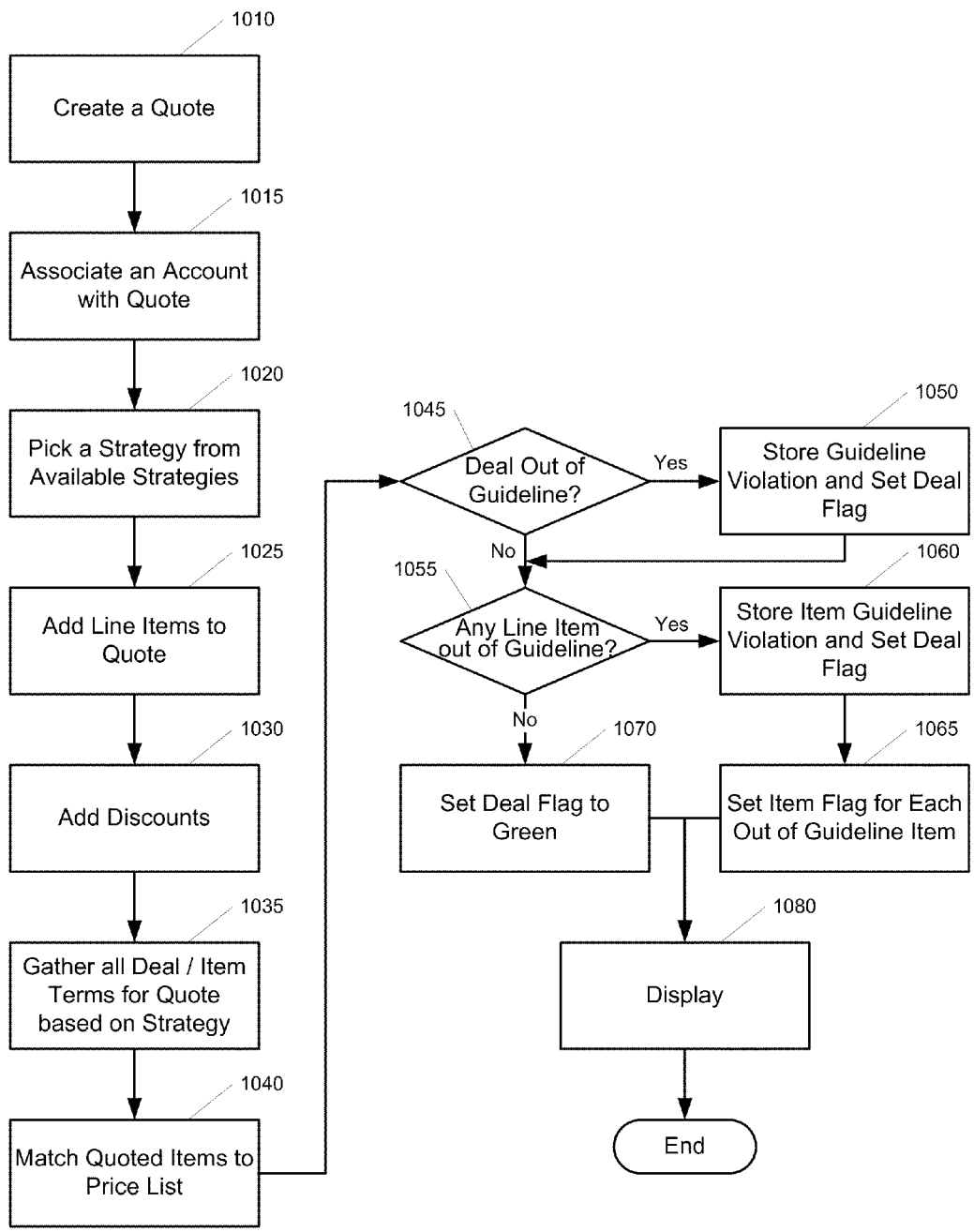
FIG. 10 is a simplified flow diagram illustrating an example of a process that can be followed for entry and analysis of a customer quote, in accord with embodiments of the present invention.

FIG. 10 is a simplified flow diagram illustrating an example of a process that can be followed for entry and analysis of a customer quote, in accord with embodiments of the present invention. In response to a request to provide a quote, a sales representative can create a quote (1010). As discussed above, the sales representative can use an interface such as that provided in FIG. 9A to perform quote creation. Quote creation can involve associating an account with the quote (1015). By such account association, the pricing segment previously associated with the account will automatically be associated with the quote. The automatically associated Pricing Segment can be displayed, for example, in the quote header in a pricing segment field 910. The sales representative can then pick a strategy from the available strategies for the pricing segment and the customer in light of pricing lists and the like (1020).

As illustrated in FIG. 9C, the sales representative can then add line items to the quote for the various items desired by the customer (1025). To the extent that additional discounts are proposed during the course of negotiating the quote, the sales representative can add those discounts to the various line items listed (1030). At this point, the quote management subsystem, through interaction with the deal management subsystem, can gather all item and deal pricing terms associated with the quote or order based on the selected pricing strategy (1035).

Figure 11:
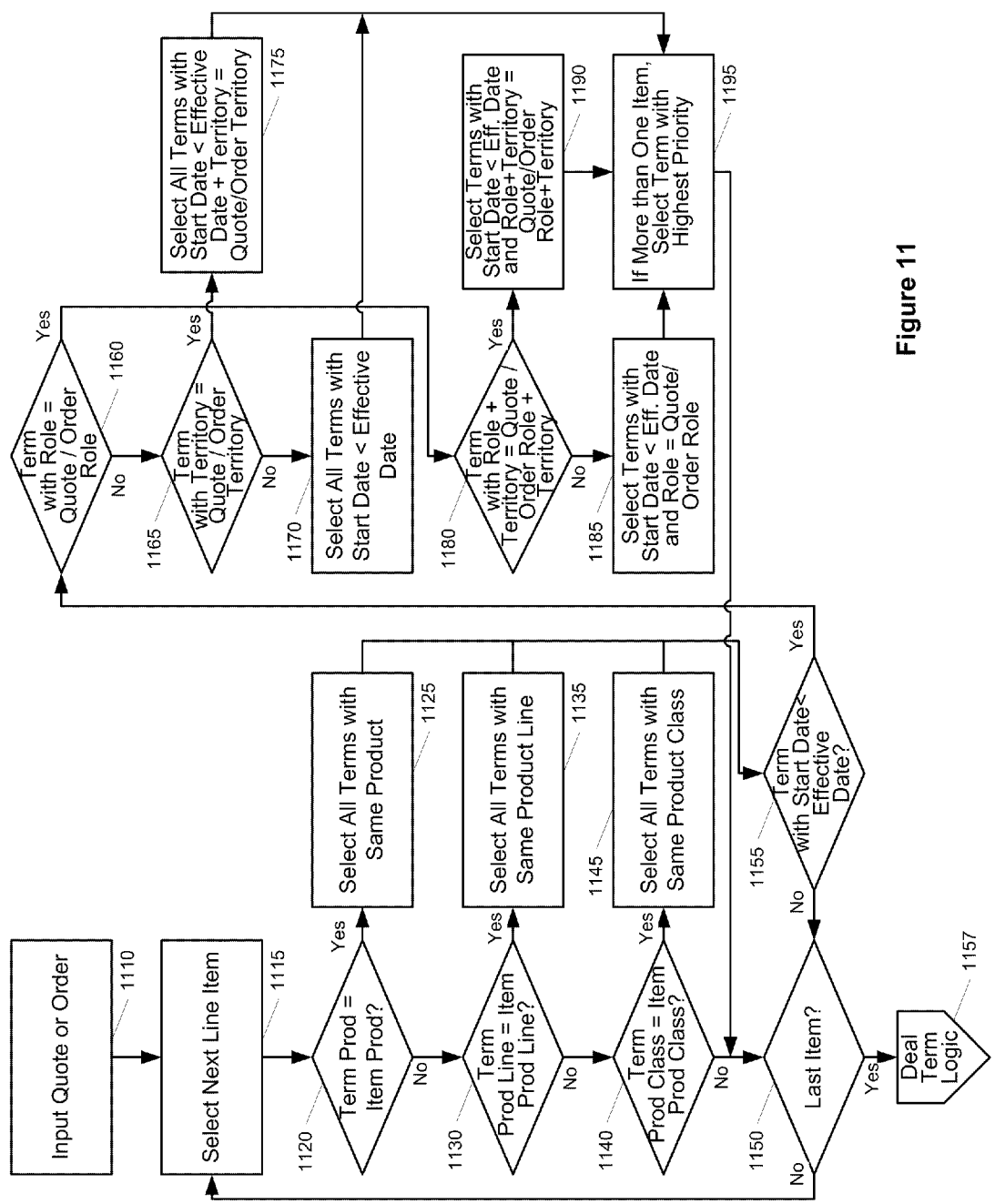
FIG. 11 is a simplified flow diagram illustrating an example of a process for gathering item terms associated with a quote or order, in accord with embodiments of the present invention.

FIG. 11 is a simplified flow diagram illustrating an example of a process for gathering item terms associated with a quote or order, in accord with embodiments of the present invention. As discussed above with regard to steps 1010-1030, the various parameters for the quote or order can be input (1110). A process then begins to review each line item in the quote or order (1115). A determination can then be made as to whether any product terms defined in table S_DM_GLTERM 420 have a product that is the same as an item product (1120). If this is the case, then all product terms having a same product as that of the item are selected (1125). If no product term has a product equal to the product of the item, then a determination is made as to whether any product terms have a product line equal to the item's product line (1130). If so, then all terms having the same product line as that of the item are selected (1135). If no product terms have a matching product line as that of the item, then a determination is made as to whether any product terms have a product class equal to that of the item's product class (1140). If so, then all terms having the same product class as that of the item are selected (1145). If no product term has a product class equal to the product class of the item, then a determination is made as to whether the item being analyzed is the last item of the quote or order (1150). If the present item is not the last item then the process returns to selecting the next line item for analysis (1115) and the process continues until the last item has been analyzed. If the present item is the last item, then the process can continue to selecting an appropriate deal term associated with the order, as will be discussed more fully with regard to FIG. 12 (1157).

Since more than one pricing term can be selected for a particular item, a process for selecting the best term to use in determining whether a quoted price is in alignment with a pricing strategy is used. The selection process can begin, for example, by making a determination as to whether the pricing term has a start date prior to the effective date of the quote or order (1155). If there is no pricing term with a start date before the effective date, then the process can determine whether or not this is the last item in the list (1150) and return to selecting a next line item for analysis or to go to a deal term selection logic illustrated in FIG. 12 (1157). If there are terms having a start date prior to the effective date, those items are selected for further analysis, then a determination can be made as to whether a defined role associated with those terms is the same as that associated with the quote or order (1160). The role, as discussed above, is associated with the user who is performing the entry or analysis of the quote or order. If there are no pricing terms having the same role as that of the user who is performing the analysis, then a determination can be made, for example, as to whether a pricing term having an appropriate effective date also has the same territory as that of the quote or order (1165). The territory can relate to the geographic limitations of particular pricing terms, for example. If there is no pricing term having a matching territory (or role), then terms can be selected having just the start date before the effective date (1170). If there are terms having a territory the same as that associated with the quote or order, then those terms having the matching territory as well as the start date before the effective date of the quote or order can be selected (1175).

If there are selected pricing terms having a role the same as that of the person performing the analysis as well as an appropriate effective date (1160), then a determination can be made as to whether there are also selected pricing terms having a role and territory the same as the quote or order (1180). If not, then a selection can be made of terms having a matching role along with a start date prior to the effective date (1185). If there are terms having a role and territory the same as those associated with the quote or order along with a start date prior to the effective date, then a selection can be made of those matching terms (1190).

Once this analysis of a matching of term parameters has been made, there may still be more than one term selected for a particular line item. In this case, a determination can be made of relative prioritization of guideline terms that has been predetermined by the deal management administrator when entering those guideline terms. This can be performed by a deal management administrator, for example, by having a sequence number associated with guideline terms and those terms with higher priority having a lower sequence number. Thus, selection of an appropriate guideline term in an event of more than one guideline term being available can be made by choosing the guideline term with the lowest sequence number or highest priority.

The above describes an example of criteria that can be used to select a particular guideline pricing term for a line item in a quote. Depending upon the nature of defined guideline pricing terms for an enterprise, different criteria can be used to select an appropriate guideline term from among many guideline terms available for a particular line item. Once a pricing term has been selected for a line item, that selected term identifier can be stored for use in analysis that will follow for that line item. A determination can also be made as to whether this is the last line item to be analyzed (1150), and if not then a selection can be made of the next line item and the process can continue for that line item (1115). If the last line item has been analyzed, then the process can continue to selection of an appropriate deal term to be associated with the order or quote (1157).

Figure 12:
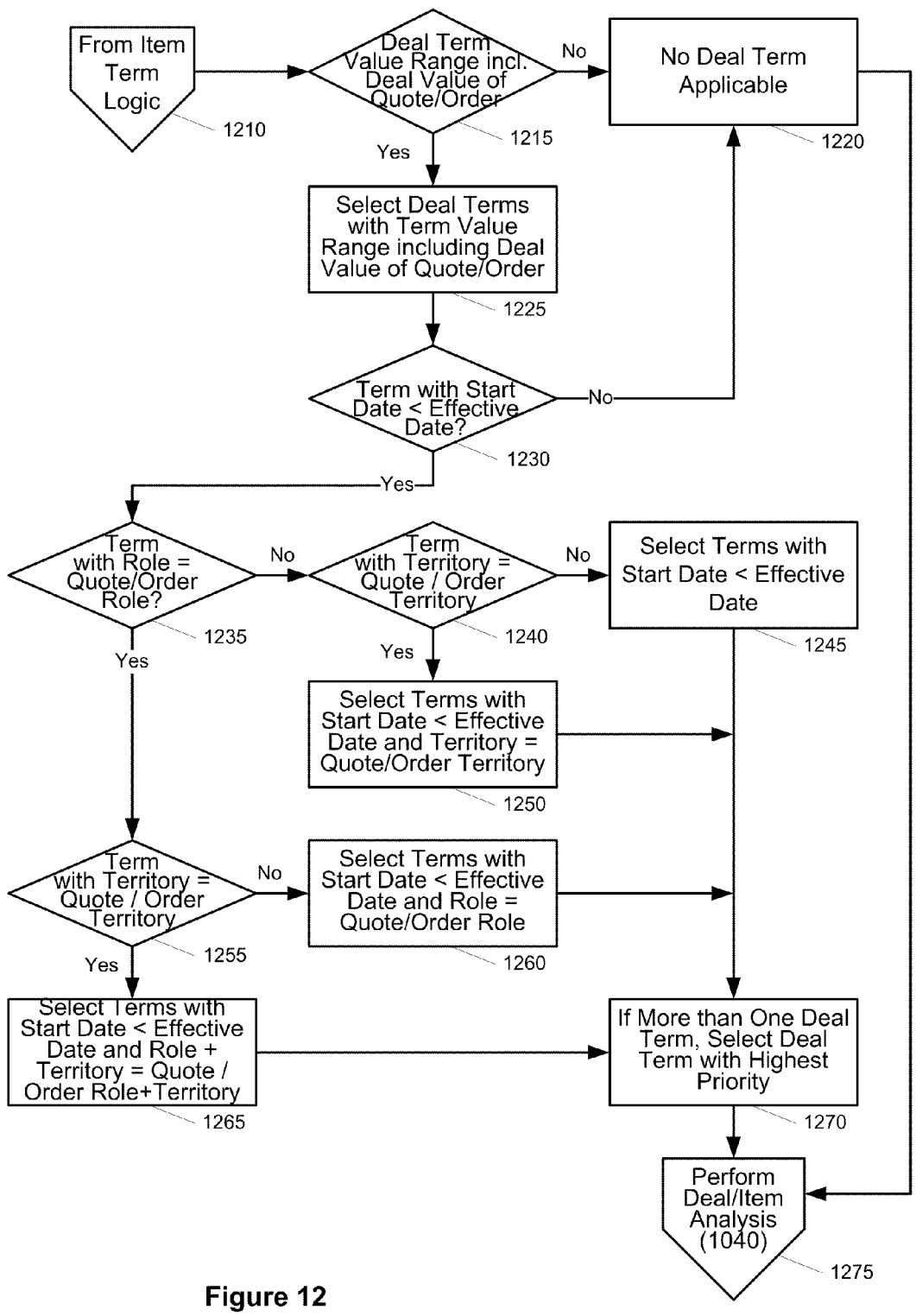
FIG. 12 is a simplified flow diagram illustrating a process for selecting an appropriate deal guideline term to be associated with a quote or order, in accord with embodiments of the present invention.

FIG. 12 is a simplified flow diagram illustrating a process for selecting an appropriate deal guideline term to be associated with a quote or order, in accord with embodiments of the present invention. FIG. 12 continues the process started by FIG. 11 and is entered from step 1157 (1210). A determination can be made as to whether a deal guideline term has a term value range that includes a deal value of the quote or order (1215). If there is no such deal term then there is no deal term applicable (1220) and the process can continue to step 1040 of FIG. 10 as will be described below (1275). If a deal term having a term value range including a deal value of the quote or order does exist, then the process can select deal guideline terms with a term value range including the deal value of the quote or order (1225).

Since there can be more than one deal guideline term matching the above criteria, as discussed above with regard to line item guideline terms, a selection process can be performed for determining an appropriate deal term. For example, a determination can be made as to whether a deal term has a start date prior to the effective date of the quote or order (1230). If there is no such deal term then there are no deal terms applicable to the current deal (1220) and the process can continue by returning to the flow of FIG. 10 (1275).

If a deal term has a start date prior to the effective date, then a determination can be made as to whether a role associated with the deal term is the same as that of the person performing the analysis of the quote or order (1235). If not, then a determination can be made as to whether a deal term has an associated territory the same as that associated with the quote or order (1240). If not, then the process can select those deal terms just having a start date prior to the effective date of the deal or order (1245). If there are deal terms having the same territory as that of the quote or order as well as a start date prior to the effective date of the quote or order (1240), then a selection can be made of those deal terms having the appropriate territory and starting date prior to the effective date of the quote or order (1250).

If there are deal terms having a start date prior to the effective date as well as a role matching that of the person performing the analysis (1235), then a determination can be made as to whether any of those deal terms also have an associated territory that is the same as that associated with the quote or order (1255). If not, then the process can select deal terms having an associated role corresponding to that of the person performing the analysis and an associated start date prior to the effective date of the quote or order (1260). If there are deal terms having an associated start date prior to the effective date and an associated role matching that of the person performing the analysis and a territory corresponding to that of the quote or order (1255), then a selection can be made of deal terms having matched all those parameters (1265).

As with the selection process for line item guideline terms, there can be more than one deal term that matches the various parameters of the quote or order. Selection can then be made of the deal term having the highest priority, for example, having the lowest sequence number as described above (1270). Once a deal term has been selected to be associated with the quote or order, that deal guideline term can be stored for use in further analysis. The process can then return to the analysis flow of FIG. 10 (1275).

Once the item and deal guideline terms have been selected for each line item and the overall deal, each quoted line item can be matched to its appropriate price in the price list associated with the deal (1040). A determination can then be made as to whether the deal itself is outside of the deal guideline term associated with the deal (1045). If the deal is outside of the guideline then a guideline violation can be stored and a guideline flag associated with the deal can be set for display to the user (1050). A variety of thresholds can be associated with a deal violation such that flagged information can be more than just binary. For example, a merely cautionary flag can be provided (yellow) if the deal parameters are within a certain range and then to a fatal flag (red) if the deal parameters exceed a particular threshold. A determination can then be made as to whether any line item is outside of the associated item guideline term determined above (1055). If so, then the item guideline violation can be stored and an informative flag can be set for display to the user (1060). The item flags can then be displayed to the user (e.g., red/yellow/green) for each item (1065) and the deal flag can be set as appropriate (1070) and all determined information can then be displayed to the user (1080).

The process illustrated by FIGS. 10, 11 and 12, as well as shown in FIGS. 9A-C, shows the advantages of having the integrated system of the present invention. By integrating the deal management tables with those of the customer relationship management system, customer relationship to the pricing segment is already present through the opportunity management entry of the customers and the administrative coding of the pricing segments. Further, rules regarding the pricing of various line items are already present through the coding of pricing criteria and a single version of an appropriate price list is provided across the enterprise through the customer relationship management system. Through this integration, flagging of items and deals that are out of guideline becomes a quick calculation in real-time and is provided in a screen that is already familiar to the user performing the quote or order entry. Once flagged, a deal can be automatically referred to a price approver for analysis and approval.

Deal Analysis Workbench Utility

As discussed above, if a deal or item in a deal is quoted at a price that results in a guideline violation, then a deal or item guideline violation flag can be set associated with the deal or item. For example, if a proposed price for a deal line item is at or below a minimum recommended guideline price, then a yellow flag can be associated with that line item. If the proposed price for the line item is at or below a minimum constraining guideline for the item, then a red flag can be associated with the deal line item. When items are flagged, approval by a price approver for a price exception or guidance for a more appropriate price can be required. A graphical workbench utility can enable the price approver to quickly and effectively analyze a variety of issues associated with a deal or line item being outside of guidelines.

Embodiments of a graphical workbench utility, according to embodiments of the present invention, provide real-time inline sales analytics to help a price approver examine a line item on a deal in order to assess the current deal and impacts to profitability. A graphical workbench utility can enable a price approver to quickly assess why the current deal was rejected, approve or reject the price exception request, and provide timely pricing and policy recommendations to the sales representative associated with the deal. Questions that can be answered through the use of a graphical workbench utility include, for example, what is the market willing to pay for the product, why is the line item in question not profitable, how profitable is the current deal, and how has the customer performed historically with regard to the line item product and across all products. To answer these questions, a graphical workbench utility can provide information such as scoring and ranking a pricing request relative to the market segment, market variability analysis comparing the proposed deal pricing with other deals within the price segment, price trend analysis showing segments, invoice, and pocket prices across a selected time period, a graphical waterfall displaying components that make up a price in relationship to one another, customer account history, and segment contribution by the customer.

Figure 13:
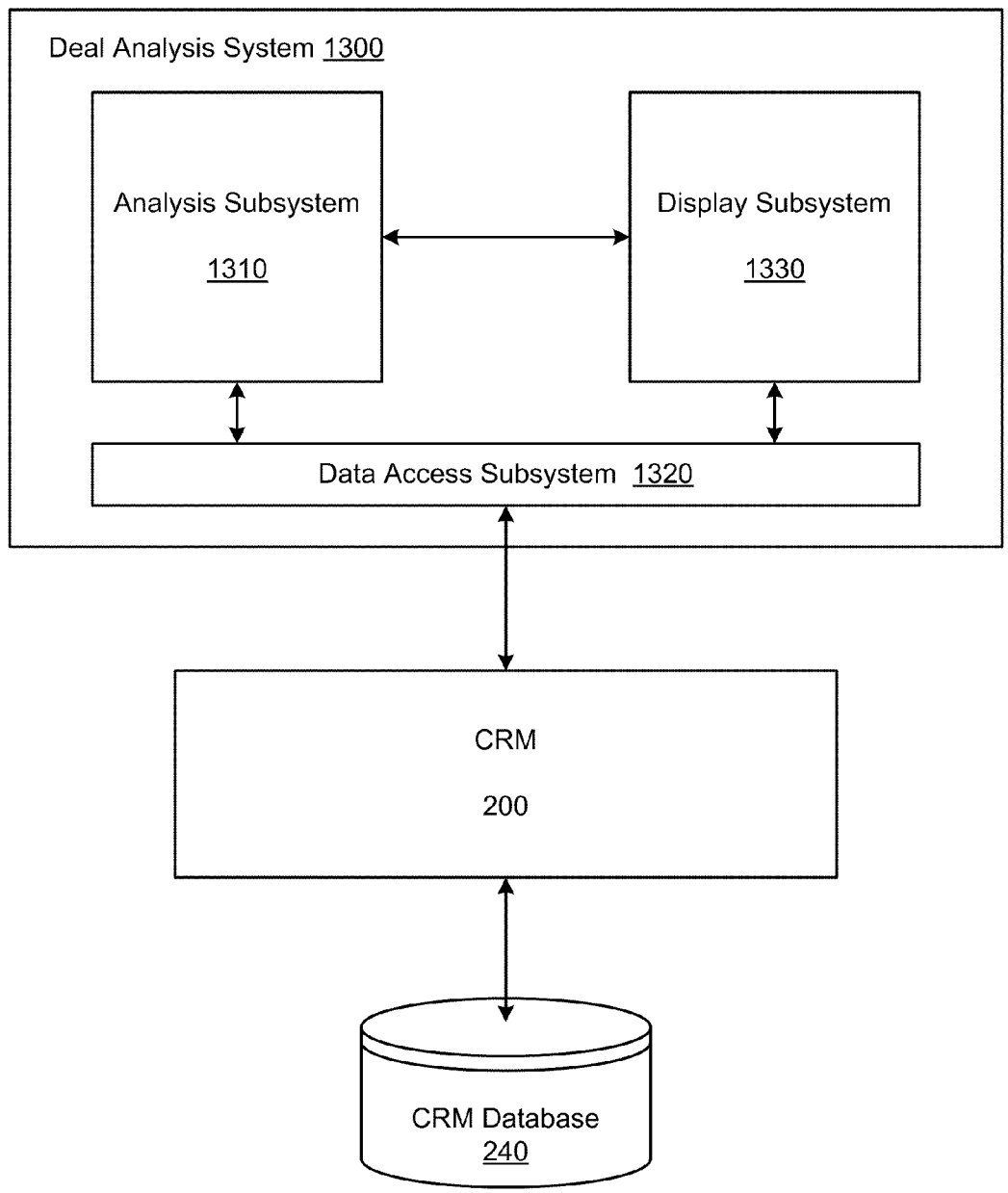
FIG. 13 is a simplified block diagram illustrating a logical configuration of a deal analysis system, incorporating elements of a graphical workbench utility in accord with embodiments of the present invention.

FIG. 13 is a simplified block diagram illustrating a logical configuration of a deal analysis system 1300, incorporating elements of a graphical workbench utility in accord with embodiments of the present invention. Deal analysis system 1300 incorporates an analysis subsystem 1310, a data access subsystem 1320, and a display subsystem 1330. In order to perform deal analysis in real time, the deal analysis system accesses data stored in, for example, CRM database 240 by virtue of being coupled to CRM system 200. Deal analysis system 1300 can be embodied, for example, as a subsystem of deal management subsystem 230 or as an external application that accesses CRM database 240 over a network connection (e.g., a middleware component). The deal analysis system can be implemented, for example, as a component 125 of a server 120, or as a web service made available to web clients 165 via a web server 170.

Analysis subsystem 1310 analyses deals or line items of deals in light of other deals in the same customer segment as that associated with the deal. Analysis subsystem is typically invoked when a sales representative generates an invoice or order that includes an item that is out of guideline, and is therefore flagged, as discussed above. A sales representative can submit the deal for approval and the deal information is provided to deal analysis system 1300 via data access subsystem 1320. From that deal information, analysis subsystem 1310 can determine the customer segment associated with the deal as well as information about the items that are out of guideline and access from CRM database 240, via data access subsystem 1320, information about deals in the same customer segment that include the items. As discussed below, analysis subsystem 1310 can perform a variety of comparison analyses of the out of guideline items against the customer segment data using real-time data associated with the customer segment, including, for example, pricing score, variability analysis, price trend over time, waterfall analysis, and customer account history. Once analysis subsystem 1310 has completed calculations, the results of those calculations can be presented to a price approver via a display subsystem 1330. As part of the analysis process, the price approver can perform "what-if" type analyses by entering, for example, adjusted prices or quantities through the display subsystem, which are then used in recalculations of the comparison analyses.

Embodiments of the graphical workbench utility of the present invention provide the requested analytics by accessing data stored in a customer relationship management system in accord with the deal management data model discussed above. In this manner, the graphical workbench utility can provide real-time analysis of a deal or item within a deal in light of current customer segment information. Similarly, adjustments or other information provided by a price approver can be accessed immediately by a sales representative putting together the deal. Access by the graphical workbench utility to CRM database 240 can be direct or indirect (e.g., via an API, such as Siebel Internet Session Network API, or web services).

Figure 14:
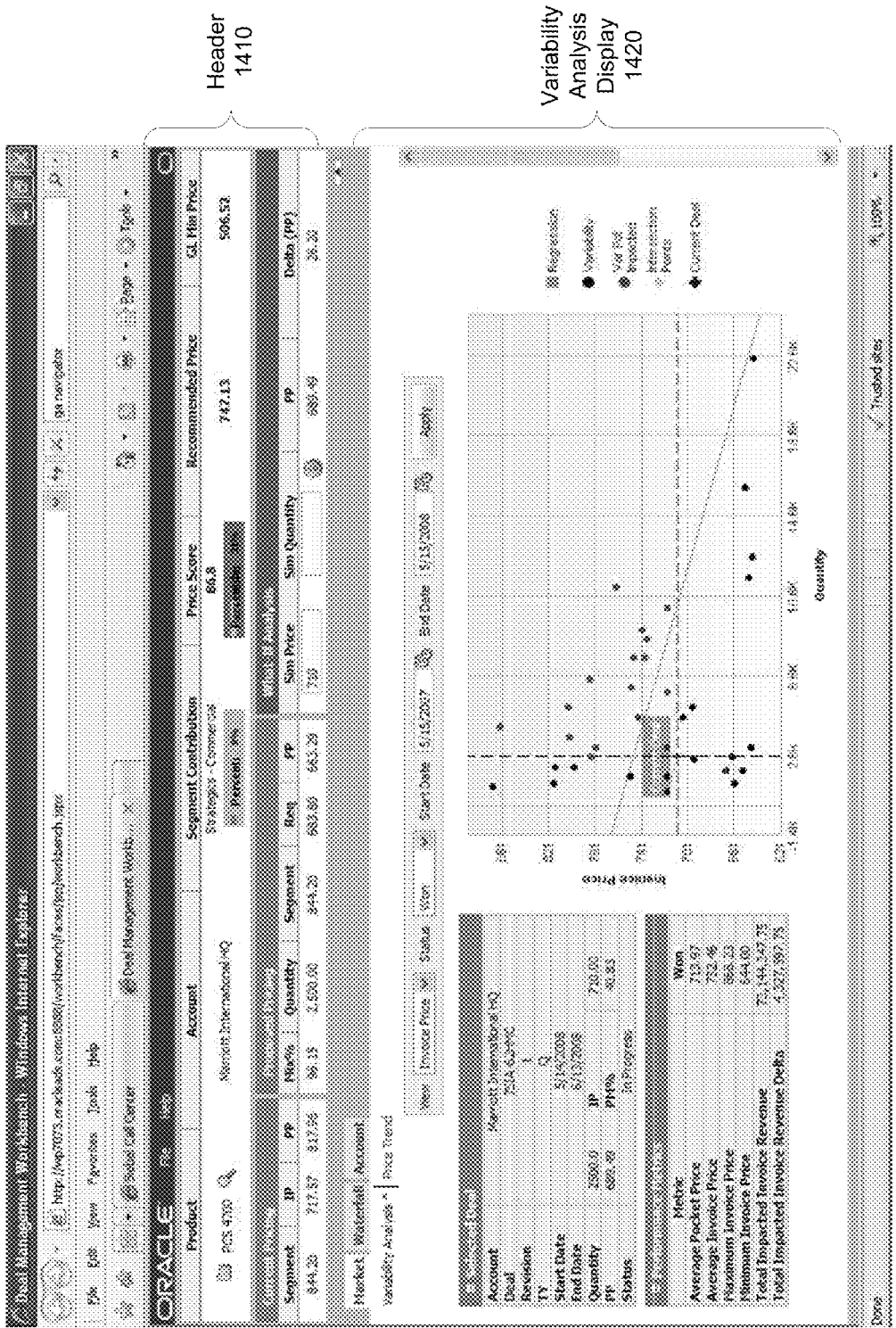
FIG. 14 illustrates an example of a variability analysis display provided by a graphical workbench utility, in accord with embodiments of the present invention.

FIG. 14 illustrates an example of a display provided by a graphical workbench utility, in accord with embodiments of the present invention. The display illustrated in FIG. 14 can be divided into two informational sections, or a header 1410 and a variability analysis display 1420.

Header 1410 displays basic information about a customer associated with a displayed deal and pricing of a deal line item being analyzed. As illustrated, the first line of header 1410 includes fields directed toward product, account, segment contribution, price score, recommended price, and guideline minimum price. The product field includes an identifier of the product for which the graphical workbench utility is providing sales and market data (e.g., "PCS 4700"). The account field includes the name of the customer associated with the deal being analyzed. The segment contribution field includes an indicator of the customer segment to which the customer named in the account field belongs (e.g., "strategics-commercial") and a percentage of all sales within the segment made by the present customer over a specified time period of the product being analyzed. The segment contribution percentage can be calculated, for example, as a sum of the pocket margin for the present product on deals won by the present customer divided by a sum of the pocket margin of this product for all deals won by all customers in the present segment. The time period can be a default time period configured by a pricing administrator or a specified override time period. Since the graphical workbench utility has real-time access to the data in CRM database 240, a pricing administrator will have up-to-date information upon which to perform analysis.

The price score field displays a score of the requested price. The score can be used to compare the deal line item price with relative pricing for the same product within the customer segment named in the segment contribution field over a specified time period. Embodiments of the present invention calculate a price score as a function of two weighted metrics: segment score and margin score. Weighting factors can be predefined in the deal management subsystem and can be set to an even weighting by default.

According to embodiments of the present invention, a segment score reflects proximity of the current pocket price to a recommended pocket price. The segment ratio (price/recommended price) is weighted using a standard logistic function (e.g., a sigmoid curve). One example of calculating a segment score is provided by the following formula:

$$\text{Segment Score} = 100 * \frac{1}{(1 + e^{-((SegRatio - 0.8)*10)})}$$

Thus, a segment ratio of 1 (e.g., pocket price equals recommended price) yields a high score (approximately 90), which slowly improves for prices quoted above the recommended price (i.e., infinitely approaching 100).

A margin score can be defined, by, for example, a logarithmic curve based on a positive margin. One example of a margin score usable by embodiments of the present invention is represented by the following formula:

$$\text{Margin Score} = 2 * \left(-50 + \left(100 * \left(\frac{1}{(1 + e^{-(MarginPercent*8)})}\right)\right)\right)$$

A margin score becomes positive at a positive margin percent and reaches a good score of 90 around a 35% margin, and infinitely approaching 100.

Header 1410 also illustrates a price score percentile, which is a percentage of all comparison segment deals with price scores lower than the current requested pricing. Embodiments of the present invention can color code a price score percentile field (e.g., red if the price score percentile falls in a bottom 33.3 percentile, yellow in a middle 33.3 percentile, and green in a top 33.3 percentile).

Header 1410 also includes a field for recommended price, which is a price the graphical workbench utility recommends for this product in a customer's segment. The recommended price is derived using information from the variability analysis display, as discussed below. The guideline minimum price field provides a highest minimum constraining guideline invoice price defined for the line item product, as set by a price administrator. A deal line item invoice priced below the guideline minimum price can be given a red flag on the "line item in the deal management subsystem." If no minimum guideline is set for a particular product, then no minimum guideline price will appear in header 1410. A floor price can also be displayed (not illustrated in FIG. 14), which represents the lowest pocket price a product can have. Such a field may only be displayed if a valid floor price exists for a product being analyzed. Again, this information is retrieved from the entered guideline information stored in CRM database 240.

The second line of header 1410 includes fields related to current pricing, proposed pricing, and a "what-if analysis." Current pricing fields reflect the most recent quote for the line item product, to which the customer may currently be bound. Current pricing fields can, for example, include: a segment price of the line item at the time of the customer's most current (previous) deal; invoice price ("IP") of the line item on the customer's most current (previous) deal; and, pocket price ("PP") of the line item on the customer's most current (previous) deal. Proposed pricing fields reflect current deal pricing proposed by the customer for the line item product. Proposed pricing fields can, for example, include: mixed percent, which is a percentage of quantity of all line items on the deal represented by the present line item product (i.e., the current deal's current line item quantity divided by the sum of all of the line item quantities for the current deal); quantity of the line item on the current deal; ceiling, which is the current starting price of the line item from which all discounting occurs; segment price, which is the current price of the product for this pricing segment as discounted from the ceiling price; requested price ("REQ"), which is the invoice price for this product requested by the customer for the current deal; and, pocket price ("PP"), which is what the pocket price would be after applying any discount to the requested price. The "what-if analysis" section of header 1410 will by discussed more fully below.

FIG. 14 also includes a variability analysis display 1420, which can aid in identifying why the analyzed deal line item was rejected and to illustrate what the market is willing to pay for the product. Market variability analysis compares the proposed price request to prices offered to other customers in the customer segment, and can provide insight as to which customers may be impacted by the proposed price. One assumption made is that pricing is transparent and customers will learn the prices quoted to other customers. Thus, offering a lower proposed price to a customer may send an unfavorable message to others in the pricing segment.

The performance metrics section of the variability analysis display show revenue at stake if the proposed price is granted. Market variability analysis calculations can include (1) only those deals with a deal status having been won over the selected time period, or (2) expanded or narrowed to compare the proposed deal pricing with only deals won, approved, lost, or all deals within the segment.

For the selected segment deals that fall within the time period, the market variability analysis graph shows price-to-price volume (quantity) of the selected segment deals relative to the current deal using the following:

Current Deal pricing and volume, which is displayed as the intersection of a vertical volume line and a horizontal price line;

A Regression Line showing the average deal price across the product volume (as calculated from all the data points of the selected segment deals);

Variability points representing deals where the price and/or quantity was lower than the currently proposed deal;

Potentially Impacted Deals in which a customer was given a higher price for a higher quantity (represented at points in the upper-right quadrant of the graph);

Revisions of the current deal, as provided during "what-if" analysis; and

Recommended Price for Requested Volume and Recommended Volume for Requested Price, which are represented as points appearing at the intersections of regression line with the horizontal price line and the vertical volume line of the Current Deal, respectively (the Recommended Price for Requested Volume is also displayed in the header field for Recommended Price, as discussed above).

Deal type and time period filters can be applied (e.g., using the box at the top of the variability analysis display) to get a different picture of the effect of product pricing. For example, for products in markets having price volatility, a start date can be moved closer to the current date in order to shorten the time period (the current quarter). In such a case, the graphical workbench utility can recalculate the analysis to compare the present deal with more current segment pricing, thus revealing more current price trend information. In addition, specific information regarding deals represented by points on the market variability analysis graph can be obtained by, for example, either clicking or rolling a cursor over a dot representing the deal, and information regarding that deal can be displayed in the "selected deal" area of variability analysis display 1420. Such information can include the name of the customer requesting the deal price, name of the deal that contains the current line item, revision number of the deal, deal type, and start and end dates.

The "performance metrics" area of variability analysis display 1420 are calculated for each status grouping and include only those deals meeting the selection criteria for the market variability analysis graph. Fields displayed in the "performance metrics" area can include, for example: average pocket price, which is a sum of line item pocket prices for the current product divided by the total number of deals; average invoice price, which is the sum of line item invoice prices for the current product divided by the total number of deals; maximum pocket price for the current product; maximum invoice price for the current product; minimum pocket price for the current product; minimum invoice price for the current product; total impacted pocket revenue, which is a sum of the pocket revenues of all of the line items for the current product for all the potentially impacted deals; total impacted invoice revenue, which is a sum of the invoice revenue of all the line items for the current product for all the potentially impacted deals; total impacted pocket revenue delta, which is a sum of the pocket revenues of all the line item for the current product for all the potentially impacted deals minus the sum of the product of the current invoice price and the quantities of all the line items for the current product for all the potentially impacted deals; and, total impacted invoice revenue delta, which is a sum of the invoice revenues of all the line items for the current product for all the potentially impacted deals minus the sum of the product of the current invoice price and the quantities of all the line items for the current product for all the potentially impacted deals (i.e., the revenue at stake if the requested price is granted to all other customers with deals that filtered through the current graph selection criteria).

In the market variability analysis graph of variability analysis display 1420, a regression line showing an average deal price across the product volume is displayed. The regression line position and slope can be calculated, for example, using a least squares linear regression method on the data point displayed in the graph. A recommended price point can be calculated by the slope of the regression line multiplied by a current invoice or pocket price plus a price intercept. A recommended quantity point is a quantity minus price intercept divided by the slope of the regression line.

A "what-if analysis" can be performed using the market variability analysis graph illustrated in FIG. 14. A user of the graphical workbench utility can enter either a simulated price to view analysis for a different line item price or a simulated quantity to view an analysis for a different deal quantity. Using the simulated price or quantity, the graphical workbench utility can display updated price score and recommended prices. In addition, the market variability analysis graph can be updated to reflect the simulated value. The graphical workbench utility can also provide an updated pocket price reflecting the pocket price if the line item were sold at the simulated price and a delta in the pocket price, which is a difference between the pocket price for the simulated price and the pocket price for the requested price for the current line item.

Figure 15:
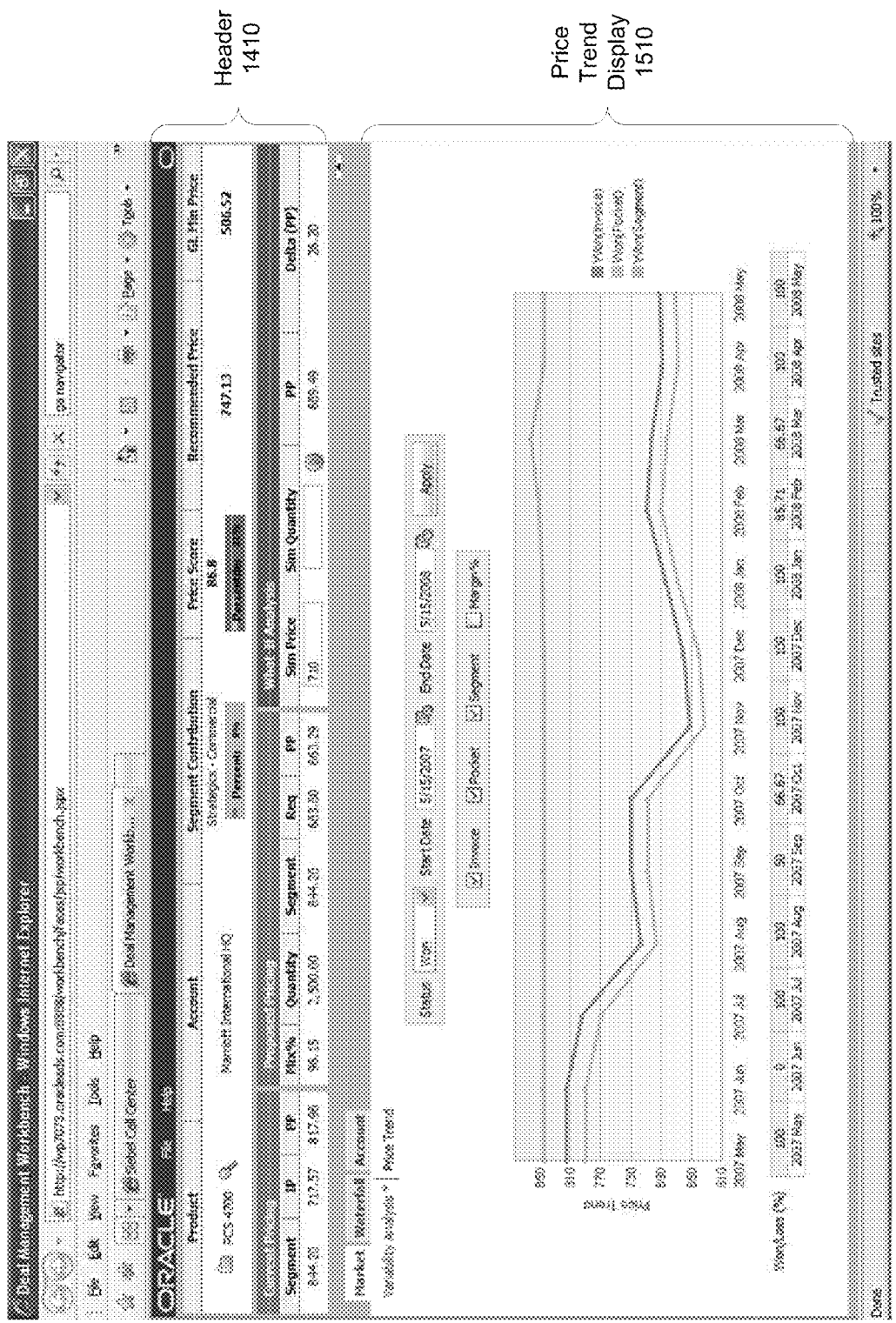
FIG. 15 is an example of a price trend display generated by a graphical workbench utility in accord with embodiments of the present invention.

FIG. 15 is an example of a price trend display generated by a graphical workbench utility in accord with embodiments of the present invention. The display of FIG. 15 is divided into two general sections: header 1410 and a price trend display 1510. Price trend display 1510 includes a price trend graph displaying deal prices over time for the line item being analyzed. A price trend graph can enable a user to identify a competitive price for the current deal.

As illustrated in FIG. 15, the price trend graph provides a trend of invoice price, pocket price and segment price for won deals over a selected time period. A user of the graphical workbench utility can elect to display deals having a status of won, approved, lost, or all deals within the customer segment. In addition, a price trend graph can also display margin percent (not illustrated). The user can also modify the displayed time periods for the data. A table displayed below the price trend graph shows a percentage of deals won during each month of the selected time period (i.e., won/lost percentage). While a price trend graph can show where the prices of won deals are headed, the table displays a portion of total deals quoted at those prices that were actually won (i.e., a total count of won segment comparison deals divided by a sum of the won and lost segment comparison deals). In the example of FIG. 15, segment price has held steady over the time period, but sales is providing greater discounting to those customers in the segment being analyzed over other segments.

Figure 16:
FIG. 16 illustrates an example of a waterfall display of a graphical workbench utility, in accord with embodiments of the present invention.

FIG. 16 illustrates an example of a waterfall display of a graphical workbench utility, in accord with embodiments of the present invention. FIG. 16 is divided into two sections: header 1410 and waterfall display 1610. A waterfall graph displays components of pricing and revenue and can enable a user to evaluate profitability of proposed and hypothetical item prices and quantities. A price waterfall shows the various factors involved in overall margin and profitability, as discussed above with regard to creation of guideline plans. As illustrated, different price break points for proposed pricing in the customer segment are illustrated (e.g., ceiling price, segment price, invoice price, pocket price and margin). These price break points can be displayed, for example, using a common color. Other bars on waterfall display 1610 represent adjustments, or discounting taken from the previous price point, for example, segment adjustment, volume adjustment-simple, manual discount adjustment, and the like. These adjustment bars can be displayed, for example, in a contrasting color to those representing the price break points. Differing colors can be used to facilitate analysis per the user's preference.

A product can be configured with multiple constraining and recommended guidelines as defined in the deal management subsystem, as described above. A constraining guideline is a pricing boundary that a price administrator allows users to work within, while a recommended guideline is what a pricing administrator thinks a product should be priced. Each type of guideline can appear on a associated price bar on a waterfall display with a name of the guideline. As illustrated, a minimum price guideline is illustrated on the invoice price bar of waterfall display 1610. Guideline bars can also be displayed with varying colors, for example, a red line indicating a constraining guideline and that a deal line item price is in violation of that guideline, a yellow line indicating a recommended guideline and that the deal line item price is in violation of that guideline, and a green line indicating that a deal line item price is within a constraining or recommended guideline. Waterfall information can be displayed in a waterfall display for an entire quote or deal as well as for an individual line item, thereby enabling a user to compare a line item with an overall profitability of a deal. Using a waterfall display, the impact of each discount incentive offered on a deal can be displayed as well as an indication of where override discounts have led the deal to pricing outside guidelines for the product and deal.

As illustrated in FIG. 16, a table having columns associated with each applicable price bar is illustrated that provides additional information related to those price bars. Fields of the table include, for example: per unit price or cost; total revenue or cost for the quantity and price; percentage of ceiling price represented by the price or adjustment; percentage of the segment price represented by the price or adjustment; and, percentage of the invoice price represented by the price or adjustment.

As with the variability analysis display, a what-if analysis can be performed, which displays waterfall information for hypothetical price and quantity values entered in the "what-if analysis" section of header 1410.

Figure 17:
FIG. 17 is an example of a customer account history display provided by embodiments of a graphical workbench utility, in accord with embodiments of the present invention.

FIG. 17 is an example of a customer account history display provided by embodiments of a graphical workbench utility, in accord with embodiments of the present invention. The customer account history display includes a header portion 1410 and a history display 1710. History display 1710 includes part history, which is a list of customer deal line items showing historical pricing and how well the customer actually placed orders for the product, and portfolio history, which is a list of all deals made with this customer showing broader purchasing patterns and overall profitability. Viewing such information can provide a user of the graphical workbench utility with invoice price trend information for the product being analyzed relative to a profit margin percent for all products purchased by the customer. The information can also tell a user whether the customer's demand for the particular product is growing, how well the customer complies with quantity commitments over time, and how often the customer requests quotes from the business entity. Such information can provide an insight as to whether the business entity is facing pressure from competition, as evidenced by a history of lost deals. As with the other displays of the graphical workbench interface, data provided in history display 1710 is accessed from the various tables used and stored by the customer response management system 200, including opportunity management subsystem 210, quote management subsystem 220 and deal management subsystem 230.

As illustrated, the part history section of history display 1710 includes fields related to commitments (i.e., quoted) and actuals (i.e., shipped) information. The quoted section of the part history includes fields related to, for example, the following: the number of a deal made with the customer that contained the current line item; a deal type (e.g., quote); start date, which is the effective from date for the deal; mix percent, which is the percentage of the total deal quantity across all line items represented by the current line item; quantity of the current line item quoted on the deal; invoice price ("IP"); pocket price ("PP"); pocket margin percent ("PM %"), which is a pocket margin divided by the total pocket revenue for the current line item; and, status of the deal (e.g., approved, won, lost, or order placed). The actuals values represent what the customer has actually bought: quantity of the current line item quoted on the deal, and shipped percent, which is the percentage of current line item quoted on the deal that the customer actually bought.

The portfolio history section of history display 1710 lists all deals made with the customer, regardless of whether they included the current line item. The portfolio history includes the following fields in a quoted or commitments section of the table, for example, as follows: deal number; deal type; start date for the deal (e.g., the "effective from" date); total quantity of all line items on the deal; total deal invoice revenues; total deal pocket revenue; pocket margin percent ("PM %"), which is the pocket margin divided by the total pocket revenue for all the line items on the deal; status (e.g., approved, won, lost, or order placed). The actuals section of the portfolio history includes, for example, the quantity of all the line items quoted on the deal that the customer actually bought and a percentage of all the line items quoted on the deal that the customer actually bought.

Through the use of these various displays, a price approver can determine impact of a price exception upon the relevant market segment. In addition, through the use of "what-if analysis," the price approver can determine alternatives to the proposed price exception, including adjustments to quantity and price. The price approver can then either approve the price, which can be immediately transmitted to the sales representative through the customer response management system, or suggest alternatives to the price exception, which can be communicated either through a messaging subsystem within the customer response management system or through an electronic mail system or other messaging system.

Figure 18:
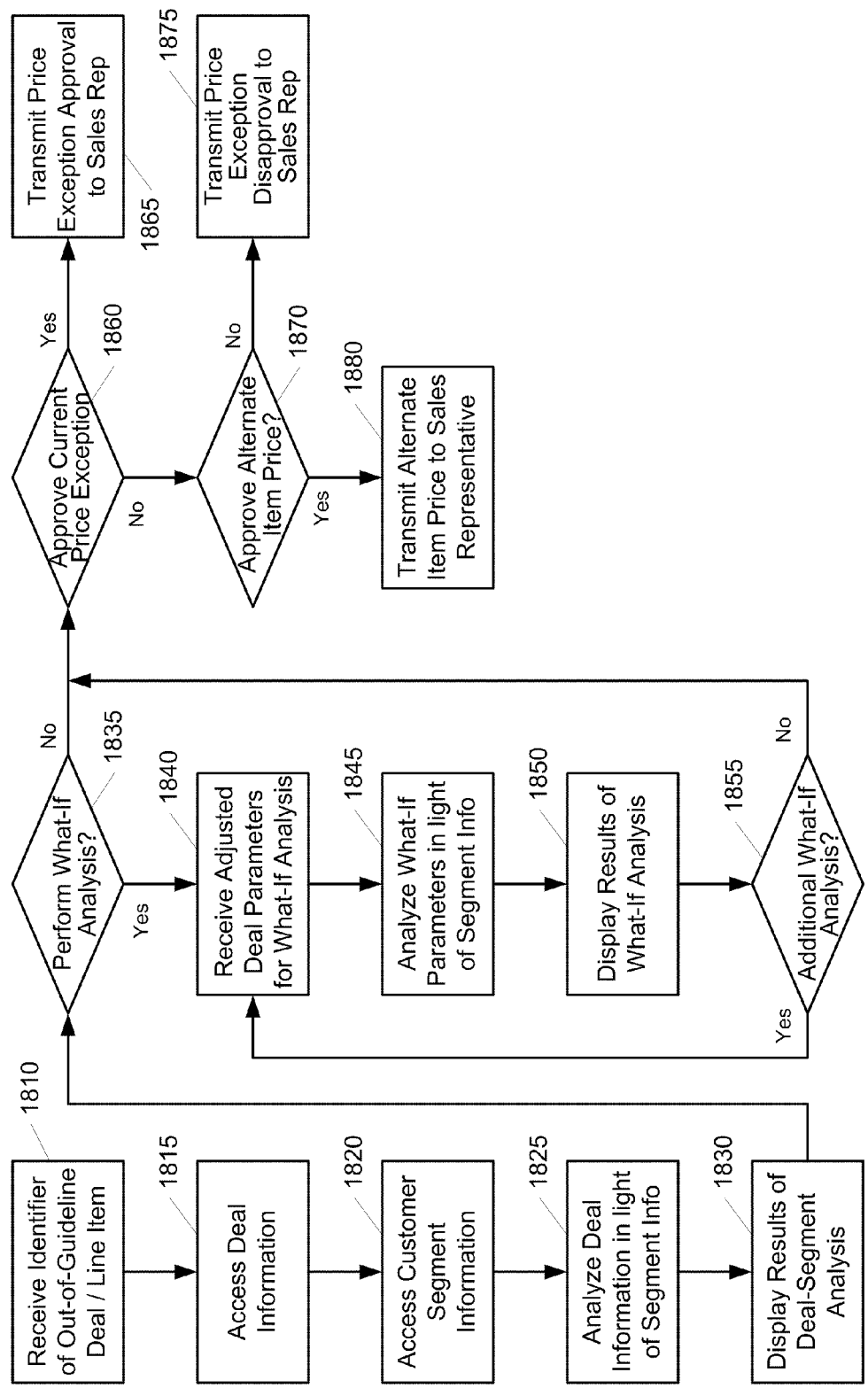
FIG. 18 is a simplified flow diagram illustrating an example of a deal analysis flow performed by embodiments of deal analysis system 1300, in accord with embodiments of the present invention.

FIG. 18 is a simplified flow diagram illustrating an example of a deal analysis flow performed by embodiments of deal analysis system 1300, in accord with embodiments of the present invention. The deal analysis system receives an identification of a deal that is either itself out of guideline or contains a line item quote that is out of guideline (1810). This identifier can be provided to the deal analysis system either by request of a sales representative using quote management subsystem 220 or automatically upon generation of an out of guideline quote by a sales representative using the quote management subsystem. Using the identifier, the deal analysis system can then access from CRM database 240 information related to the deal (1815). The deal-related information can include, for example, associated customer information (e.g., customer identification, customer segment, and the like), quote line item information, and the like. The deal analysis system can then also access information from CRM database 240 related to the customer segment associated with the customer associated with the deal, as identified in the deal-related information (1820). Segment-related information that may be accessed includes, for example, prices paid by other customers in the segment for the out-of-guideline line item to be used in generation of variability analysis display (1420).

Once the information necessary for performing deal analysis has been gathered, the deal analysis system can analyze the current deal information, including the out-of-guideline line item quote, in light of the gathered segment information (e.g., by analysis subsystem 1310) (1825). This analysis can include, for example, calculating the price score, calculating the regression line for the variability analysis display, calculating waterfall numbers, gathering and associating price trend information, and the like. Results of the analysis can then be displayed, as discussed above (e.g., by display subsystem 1330) (1830). As discussed above, these displays can be performed using a graphical user interface that allows for both display of results and entering of data by the user.

Once presented with the display, a user can opt to perform a "what-if" analysis, as discussed above (1835). If the user decides to perform a "what-if" analysis, then adjusted parameters are entered using the graphical user interface for the workbench, which are received by the analysis subsystem (1840). These adjusted parameters can be subjected to an analysis against segment pricing that is substantially similar to that performed on the out-of-guideline price information from the flagged deal (1845) and results of this analysis can be displayed by the display subsystem (1850). The user can opt to perform additional "what-if" analyses in an attempt to determine more optimal pricing to offer the customer (1855).

If a user decides to not perform a "what-if" analysis, or if a user has finished performing "what-if" analyses, the deal analysis system provides the user (e.g., a price approver) with an opportunity to decide whether to approve the current price exception (1860). If the user does approve of the price exception, then an approval can be transmitted to the sales representative through a messaging system of CRM 200 or through other messaging means such as electronic mail (1865). If the user does not approve of the price exception, then the deal analysis system can provide the user with an opportunity to specify and approve an alternate price for the out-of-guideline line item (1870). If the user does not provide an approved alternate price, a disapproval indication of the pricing exception can be transmitted to the sales representative (1875). If the user provides an approved alternate price, that price can be transmitted to the sales representative (1880).

Through the use of a deal analysis system, as described above, a price approver can review proposed deals having item pricing that is out of guideline, using up-to-date information about deals entered into the customer response management system. This is made possible by having access to current data stored by the CRM (e.g., accessing CRM database 240). Pricing scores, variability analysis and waterfall analysis are examples of techniques that can be presented by the deal analysis workbench utility for use by the price approver in determining whether to approve a current pricing or provide alternative pricing proposals.

An Example Computing and Network Environment

As shown above, the present invention can be implemented using a variety of computer systems and networks. An example of one such computing and network environment is described below with reference to FIGS. 19 and 20.

Figure 19:
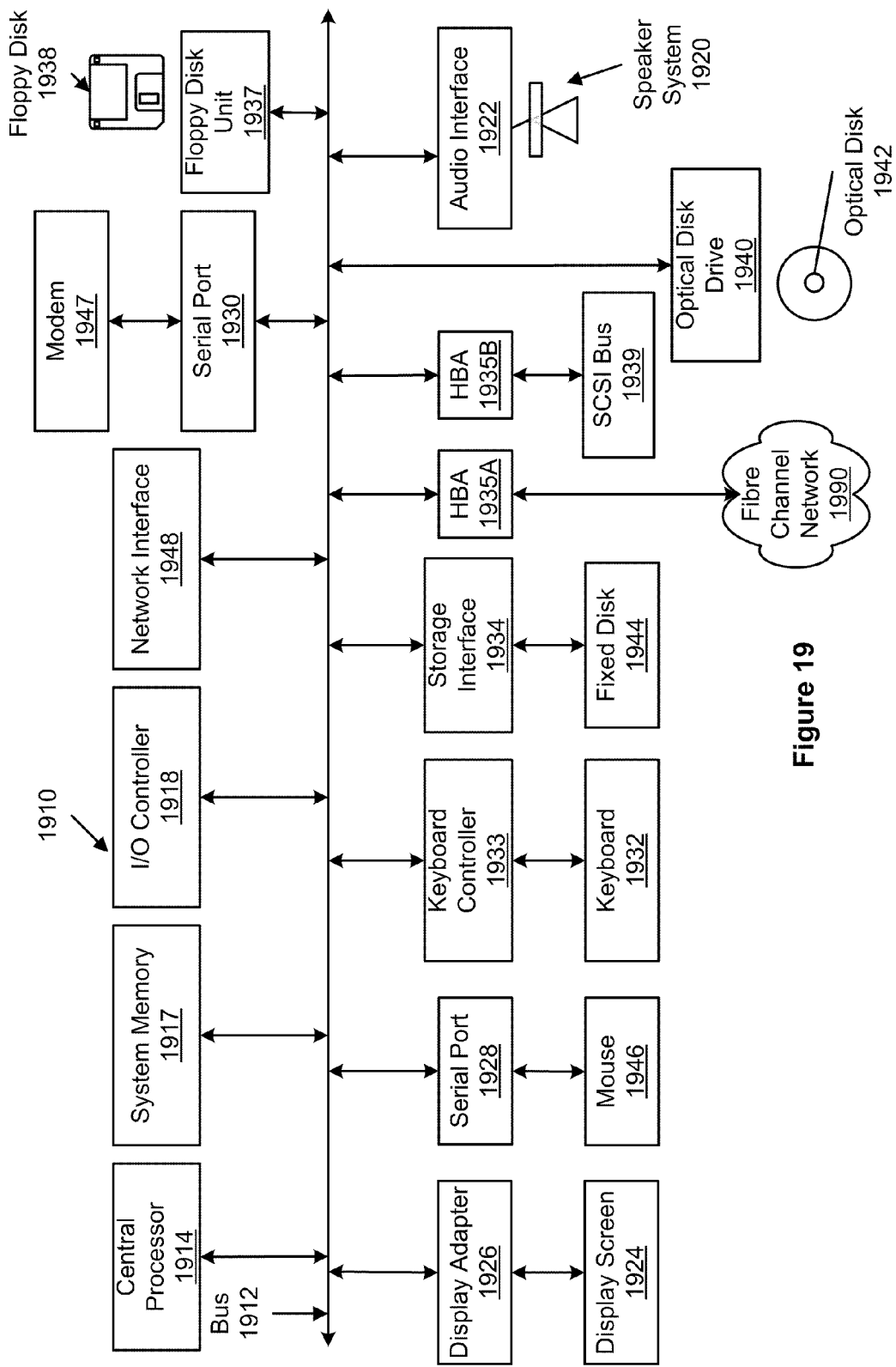
FIG. 19 is a simplified block diagram of a computer system suitable for implementing aspects of the present invention.

FIG. 19 depicts a block diagram of a computer system 1910 suitable for implementing aspects of the present invention (e.g., servers 120, gateway server 150, clients 160 and web clients 165). Computer system 1910 includes a bus 1912 which interconnects major subsystems of computer system 1910, such as a central processor 1914, a system memory 1917 (typically RAM, but which may also include ROM, flash RAM, or the like), an input/output controller 1918, an external audio device, such as a speaker system 1920 via an audio output interface 1922, an external device, such as a display screen 1924 via display adapter 1926, serial ports 1928 and 1930, a keyboard 1932 (interfaced with a keyboard controller 1933), a storage interface 1934, a floppy disk drive 1937 operative to receive a floppy disk 1938, a host bus adapter (HBA) interface card 1935A operative to connect with a Fibre Channel network 1990, a host bus adapter (HBA) interface card 1935B operative to connect to a SCSI bus 1939, and an optical disk drive 1940 operative to receive an optical disk 1942. Also included are a mouse 1946 (or other point-and-click device, coupled to bus 1912 via serial port 1928), a modem 1947 (coupled to bus 1912 via serial port 1930), and a network interface 1948 (coupled directly to bus 1912).

Bus 1912 allows data communication between central processor 1914 and system memory 1917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1910 are generally stored on and accessed via a computer-readable medium, such as a hard disk drive (e.g., fixed disk 1944), an optical drive (e.g., optical drive 1940), a floppy disk unit 1937, or other storage medium. Additionally, applications can be in the form of electronic signals modulated in accordance with the application and data communication technology when accessed via network modem 1947 or interface 1948.

Storage interface 1934, as with the other storage interfaces of computer system 1910, can connect to a standard computer-readable medium for storage and/or retrieval of information, such as a fixed disk drive 1944. Fixed disk drive 1944 may be a part of computer system 1910 or may be separate and accessed through other interface systems. Modem 1947 may provide a direct connection to a remote server via a telephone link or to the Internet via an internet service provider (ISP). Network interface 1948 may provide a direct connection to a remote server via a direct network link to the Internet via a POP (point of presence). Network interface 1948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 19 need not be present to practice the present invention. The devices and subsystems can be interconnected in different ways from that shown in FIG. 19. The operation of a computer system such as that shown in FIG. 19 is readily known in the art and is not discussed in detail in this application. Code to implement the present invention can be stored in computer-readable storage media such as one or more of system memory 1917, fixed disk 1944, optical disk 1942, or floppy disk 1938. The operating system provided on computer system 1910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 20:
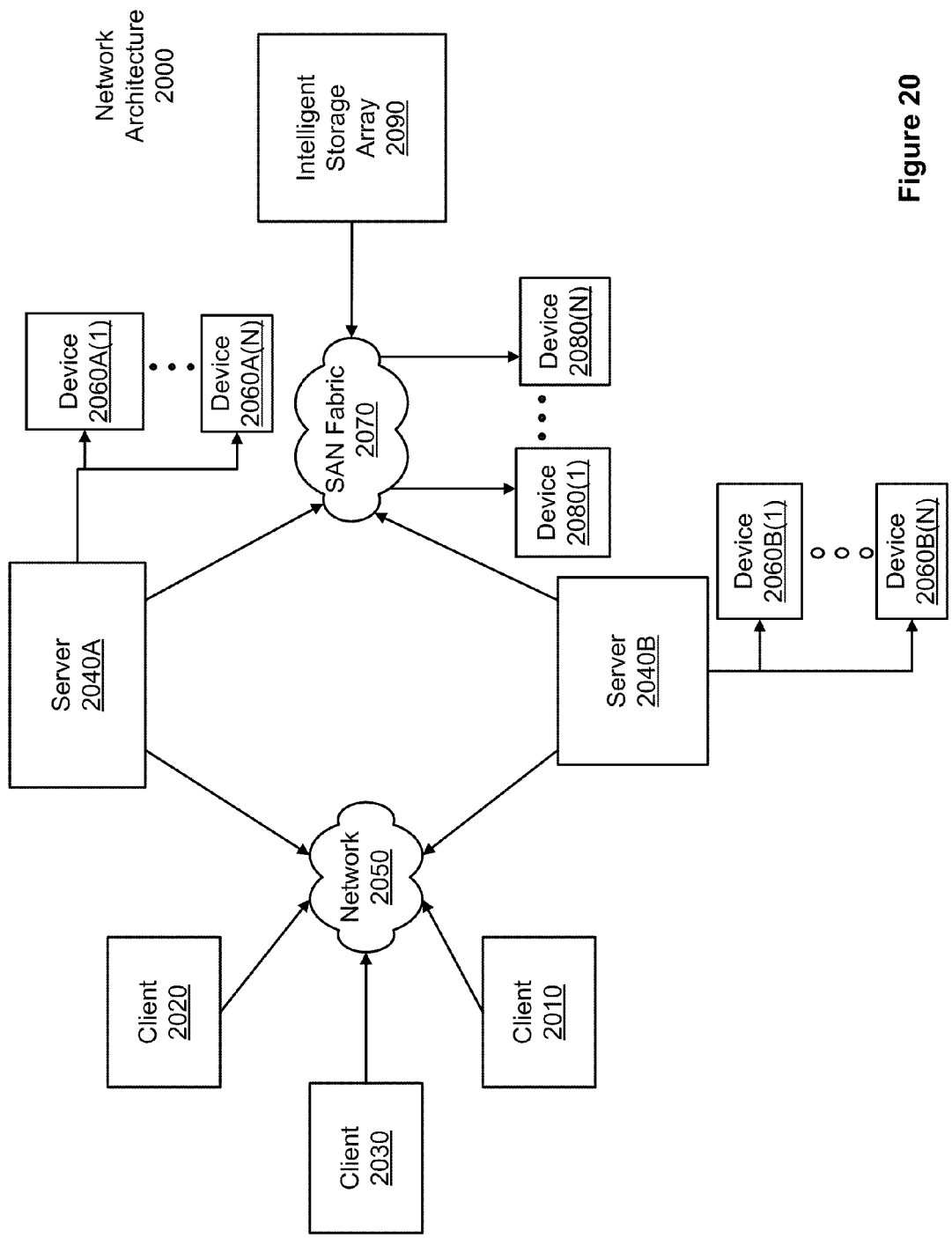
FIG. 20 is a simplified block diagram illustrating a network architecture suitable for implementing aspects of the present invention.

FIG. 20 is a block diagram depicting a network architecture 2000 in which client systems 2010, 2020 and 2030, as well as storage servers 2040A and 2040B (any of which can be implemented using computer system 1910), are coupled to a network 2050. Storage server 2040A is further depicted as having storage devices 2060A(1)-(N) directly attached, and storage server 2040B is depicted with storage devices 2060B(1)-(N) directly attached. Storage servers 2040A and 2040B are also connected to a SAN fabric 2070, although connection to a storage area network is not required for operation of the invention. SAN fabric 2070 supports access to storage devices 2080(1)-(N) by storage servers 2040A and 2040B, and so by client systems 2010, 2020 and 2030 via network 2050. Intelligent storage array 2090 is also shown as an example of a specific storage device accessible via SAN fabric 2070.

With reference to computer system 1910, modem 1947, network interface 1948 or some other method can be used to provide connectivity from each of client computer systems 2010, 2020 and 2030 to network 2050. Client systems 2010, 2020 and 2030 are able to access information on storage server 2040A or 2040B using, for example, a web browser or other client software (not shown). Such a client allows client systems 2010, 2020 and 2030 to access data hosted by storage server 2040A or 2040B or one of storage devices 2060A(1)-(N), 2060B(1)-(N), 2080(1)-(N) or intelligent storage array 2090. FIG. 20 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1910). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 1.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims

What is claimed is:

1. A deal analysis system of a customer relationship management system, comprising:
   a processor;
   a memory, wherein
      the memory is coupled to the processor;
   a customer relationship management system database, wherein
      the processor is coupled to the customer relationship management system database;
   a data access subsystem, wherein
      the data access subsystem is coupled to the processor, the memory, and the customer relationship management system database,
      the data access subsystem is configured by the processor to access one or more tables stored in the customer relationship management system database of the customer relationship management system,
      the one or more tables comprise
         pricing information, and
         customer relationship information, and
      the customer relationship management system is configured using the processor to support a plurality of client systems by configuring the customer relationship management system database to allow the plurality of client systems to share access to the one or more tables; and
   an analysis subsystem, wherein
      the analysis subsystem is coupled to the processor, the memory, and the data access subsystem,
      the analysis subsystem is configured by the processor to
         identify a customer,
         select a current deal stored in the one or more tables,
         associate the customer with the current deal, and
         compare parameters of the current deal with corresponding parameters of past deals associated with other customers in a customer population segment to facilitate generation of a price quote for the current deal, wherein
            the customer population segment further comprises the customer,
            the customer is associated with the current deal,
            the current deal represents at least part of a sales transaction,
            the sales transaction is facilitated by the customer relationship management system, and
            the sales transaction is conducted via one of the plurality of client systems,
         allow a first user of the customer relationship management system to determine whether the price quote violates a pricing policy, and
         in response to a determination that the price quote violates the pricing policy, allow the first user to create a pricing exception.

2. The deal analysis system of claim 1, wherein the analysis subsystem is further configured by the processor to:
   calculate an effect of the pricing exception on the other customers in the customer population segment,
   display the effect, and
   generate a price score, wherein
      the price score is a relative relation of a product price associated with the current deal, and
      the product price is in the customer population segment.

3. The deal analysis system of claim 2, wherein the analysis subsystem performs the generating the price score by being further configured by the processor to:

generate a segment score associated with a proximity of a current pocket price of a product associated with the current deal to a recommended pocket price;
generate a margin score associated with a margin percent of the product price associated with the current deal; and
generate the price score by adding a weighted segment score to a weighted margin score, wherein
the display of the effect by the analysis subsystem is configured to facilitate identification of an impact on future revenue and margin when the current deal is offered to one or more of the other customers in the customer population segment.

4. The deal analysis system of claim 1, wherein the analysis subsystem is configured to select the current deal stored in the one or more tables by being further configured by the processor to:
search deal-related data stored in the customer relationship management system database for an indication that the current deal or a line item price associated with the current deal is outside of a guideline associated with the current deal or the line item price; and
select the current deal in response to the current deal or the line item price associated with the current deal being outside of the guideline associated with the current deal or the line item price.

5. The deal analysis system of claim 1, wherein the analysis subsystem is configured to select the current deal stored in the one or more tables by being further configured by the processor to:
receive a request to analyze the current deal from a second user of the customer relationship management system, wherein
the request comprises an identifier of the current deal; and
search deal-related data stored in the customer relationship management system database for deal-related data associated with the identifier of the current deal.

6. The deal analysis system of claim 1, wherein the analysis subsystem is further configured by the processor to:
receive one or more modified parameters for the current deal from a second user of the deal analysis system; and
compare the one or more modified parameters for the current deal with corresponding parameters of the past deals associated with the other customers in the customer population segment comprising the customer associated with the current deal.

7. The deal analysis system of claim 6, wherein the modified parameters for the current deal comprise one or more of a modified item price and a modified item quantity.

8. The deal analysis system of claim 1, wherein the analysis subsystem is configured to compare parameters of the current deal with corresponding parameters of the past deals associated with the other customers in the customer population segment by being further configured by the processor to:
identify a line item price in the current deal that is outside of a guideline associated with the current deal or line item price for the customer population segment;
search in the customer population segment for the past deals comprising a line item identifier corresponding to a line item associated with the line item price;
gather prices and quantities associated with each past deal in the customer population segment comprising the line item identifier; and
generate a price versus quantity graph comprising points associated with the gathered prices and quantities and the line item price in the current deal that is outside of the guideline and a quantity of the current deal.

9. The deal analysis system of claim 8, wherein the analysis subsystem is configured to compare parameters of the current deal with corresponding parameters of the past deals associated with the other customers in the customer population segment by being further configured by the processor to:
calculate a regression line from the points associated with the gathered prices and quantities; and
generate a line on the price versus quantity graph representing the regression line.

10. A computer-implemented method in a customer relationship management system, the computer-implemented method comprising:
identifying a customer, using a processor of a computer system;
selecting a current deal stored in one or more tables of a customer relationship management system database, using the processor, wherein
the one or more tables comprise
pricing information, and
customer relationship information,
the customer relationship management system database is comprised in the customer relationship management system, and
the customer relationship management system is configured to support a plurality of client systems by configuring the customer relationship management system database to allow the plurality of client systems to share access to the one or more tables;
associating the customer with the current deal, using the processor;
comparing parameters of the current deal with corresponding parameters of past deals associated with other customers in a customer population segment, using the processor, wherein
the comparing facilitates generation of a price quote for the current deal,
the customer population segment further comprises the customer,
the customer is associated with the current deal,
the current deal represents at least part of a sales transaction,
the sales transaction is facilitated by the customer relationship management system, and
the sales transaction is conducted via one of the plurality of client systems;
allowing a user of the customer relationship management system to determine whether the price quote violates a pricing policy; and
in response to a determination that the price quote violates the pricing policy, allowing the user to create a pricing exception.

11. The computer-implemented method of claim 10, further comprising:
calculating an effect of the pricing exception on the other customers in the customer population segment,
displaying the effect, and
generating a price score of a product price associated with the current deal, wherein
the price score is a relative relation of the product price, and
the product price is in the customer population segment.

12. The computer-implemented method of claim 11, wherein the generating the price score comprises:
generating a segment score associated with a proximity of a current pocket price of a product associated with the current deal to a recommended pocket price;

generating a margin score associated with a margin percent of the product price associated with the current deal; and generating the price score by adding a weighted segment score to a weighted margin score, wherein the displaying of the effect by an analysis subsystem facilitates identification of an impact on future revenue and margin when the current deal is offered to one or more of the other customers in the customer Population segment.

13. The computer-implemented method of claim 10, wherein the selecting the current deal comprises:

searching deal-related data stored in the customer relationship management system database for an indication that the current deal or a line item price associated with the current deal is outside of a guideline associated with the current deal or the line item price; and selecting the current deal in response to the current deal or the line item price associated with the current deal being outside of the guideline associated with the current deal or the line item price.

14. The computer-implemented method of claim 10, wherein the selecting the current deal comprises:

receiving a request to analyze the current deal, wherein the request comprises an identifier of the current deal; and searching deal-related data stored in the customer relationship management system database for deal-related data associated with the identifier of the current deal.

15. The computer-implemented method of claim 10, further comprising:

comparing one or more modified parameters for the current deal with the corresponding parameters of the past deals associated with the other customers in the customer population segment comprising the customer associated with the current deal.

16. The computer-implemented method of claim 10, wherein the comparing comprises:

identifying a line item price in the current deal that is outside of a guideline associated with the current deal or line item price for the customer population segment;

searching in the customer population segment for the past deals comprising a line item identifier corresponding to a line item associated with the line item price;

gathering prices and quantities associated with each past deal in the customer population segment comprising the line item identifier; and generate a price versus quantity graph comprising points associated with the gathered prices and quantities and the line item price in the current deal that is outside of the guideline and a quantity of the current deal.

17. The computer-implemented method of claim 16, wherein the comparing comprises:

calculating a regression line from the points associated with the gathered prices and quantities; and generating a line on the price versus quantity graph representing the regression line.

18. A non-transitory computer readable storage medium storing instructions executable by a processor, the instructions comprising:

a first set of instructions configured to identify a customer;

a second set of instructions configured to select a current deal stored in one or more tables of a customer relationship management system database, wherein the one or more tables comprise
pricing information, and
customer relationship information, the customer relationship management system database is comprised in a customer relationship management system, and the customer relationship management system is configured to support a plurality of client systems by configuring the customer relationship management system database to allow the plurality of client systems to share access to the one or more tables;

a third set of instructions configured to associate the customer with the current deal;

a fourth set of instructions configured to compare parameters of the current deal with corresponding parameters of past deals associated with other customers in a customer population segment, wherein the fourth set of instructions facilitates generation of a price quote for the current deal, the customer population segment further comprises the customer, the customer is associated with the current deal, the current deal represents at least part of a sales transaction, the sales transaction is facilitated by the customer relationship management system, and the sales transaction is conducted via one of the plurality of client systems;

a fifth set of instructions configured to allow a user of the customer relationship management system to determine whether the price quote violates a pricing policy; and a sixth set of instructions configured to, in response to a determination that the price quote violates the pricing policy, allow the user to create a pricing exception.

19. The non-transitory computer readable storage medium of claim 18, wherein the instructions further comprise:

a seventh set of instructions configured to calculate an effect of the pricing exception on the other customers in the customer population segment;

an eighth set of instructions configured to display the effect; and a ninth set of instructions configured to generate a price score of a product price associated with the current deal, wherein the price score is a relative relation of the product price, and the product price is in the customer population segment.

20. The non-transitory computer readable storage medium of claim 19, wherein the ninth set of instructions comprise:

a tenth set of instructions configured to generate a segment score associated with a proximity of a current pocket price of a product associated with the current deal to a recommended pocket price;

an eleventh set of instructions configured to generate a margin score associated with a margin percent of the product price associated with the current deal; and a twelfth set of instructions configured to generate the price score by adding a weighted segment score to a weighted margin score, wherein the eighth set of instructions facilitate identification of an impact on future revenue and margin when the current deal is offered to one or more of the other customers in the customer population segment.

21. The deal analysis system of claim 2, further comprising:

a display subsystem configured by the processor to display one or more results of the comparing on a display device, wherein the display device is coupled to the deal analysis system, and the display device is configured to display the one or more results and the effect.

22. The computer-implemented method of claim 11, further comprising:
displaying one or more results of the comparing, using the processor, wherein
the displaying the one or more results and the displaying the effect are performed in conjunction with one another.

23. The non-transitory computer readable storage medium of claim 18, further comprising:
a seventh set of instructions configured to display one or more results of the comparing.

* * * * *